US010895690B1

(12) United States Patent
Doerr et al.

(10) Patent No.: US 10,895,690 B1
(45) Date of Patent: Jan. 19, 2021

(54) CANTILEVERS WITH ONE- OR TWO-DIMENSIONAL ACTUATION FOR ON-CHIP ACTIVE WAVEGUIDE COUPLING ALIGNMENT

(71) Applicant: Acacia Communications, Inc., Maynard, MA (US)

(72) Inventors: Christopher Doerr, Middletown, NJ (US); Li Chen, Edison, NJ (US); Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 16/420,655

(22) Filed: May 23, 2019

Related U.S. Application Data

(62) Division of application No. 15/639,018, filed on Jun. 30, 2017, now Pat. No. 10,345,525.

(Continued)

(51) Int. Cl.
*G02B 6/12* (2006.01)
*G02B 6/35* (2006.01)
(Continued)

(52) U.S. Cl.
CPC .............. *G02B 6/3502* (2013.01); *G02B 6/12* (2013.01); *G02B 6/262* (2013.01); *G02B 6/3566* (2013.01); *G02B 6/428* (2013.01); *G02B 6/4225* (2013.01)

(58) Field of Classification Search
CPC ........... G02B 6/3502; G02B 6/12; G02B 6/00
(Continued)

(56) References Cited

U.S. PATENT DOCUMENTS 4,781,424 A    11/1988  Kawachi et al.
5,441,343 A *   8/1995  Pylkki ................... B82Y 35/00
                                                       356/614

(Continued)

FOREIGN PATENT DOCUMENTS

JP          05297313        11/1993
JP         2009192842        8/2009
(Continued)

OTHER PUBLICATIONS

Chen Low-Loss and Broadband Cantilever Couplers Between Standard Cleaved Fibers and High-Index-Contrast Si3N4 or Si Waveguides IEEE PhotTechLtrs vol. 22 No. 23 Dec. 2010 pp. 1744-46.
(Continued)

*Primary Examiner* — Kaveh C Kianni
(74) *Attorney, Agent, or Firm* — Joseph D'Angelo

(57) ABSTRACT

Photonic integrated circuits including controllable cantilevers are described. Such photonic integrated circuits may be used in connection with other optical devices, in which light is transferred between the photonic integrated circuit and one of these optical device. The photonic integrated circuit may comprise an optical waveguide having an end disposed proximate to a facet of the cantilever. The orientation of the cantilever may be actively controlled in one or two dimensions, thus adjusting the orientation of the optical waveguide. Actuation of the cantilever may be performed, for example, thermally and/or electrostatically. Orientation of the cantilever may be performed in such a way to align the optical waveguide with an optical device.

18 Claims, 22 Drawing Sheets

Related U.S. Application Data

(60) Provisional application No. 62/357,221, filed on Jun. 30, 2016.

(51) Int. Cl.
 *G02B 6/42* (2006.01)
 *G02B 6/26* (2006.01)

(58) Field of Classification Search
 USPC .......................................................... 385/14
 See application file for complete search history.

(56) References Cited

U.S. PATENT DOCUMENTS

| | | | |
|---|---|---|---|
| 5,926,591 A | 7/1999 | Labeye et al. | |
| 6,092,422 A * | 7/2000 | Binnig | G01H 11/00 310/331 |
| 6,577,785 B1 * | 6/2003 | Spahn | G02B 6/122 385/22 |
| 6,980,727 B1 * | 12/2005 | Lin | G02B 6/266 385/140 |
| 8,326,100 B2 * | 12/2012 | Chen | G02B 6/1228 385/43 |
| 9,703,038 B1 | 7/2017 | Chen | |
| 2002/0041739 A1 | 4/2002 | Wu | |
| 2003/0108274 A1 * | 6/2003 | Haronian | G02B 6/122 385/17 |
| 2003/0113067 A1 * | 6/2003 | Koh | G02B 6/43 385/48 |
| 2004/0122328 A1 * | 6/2004 | Wang | A61B 1/00167 600/476 |
| 2004/0139808 A1 * | 7/2004 | Keller | G01L 1/044 73/862.381 |
| 2004/0184710 A1 * | 9/2004 | Kubby | G02B 6/358 385/16 |
| 2004/0184760 A1 * | 9/2004 | Kubby | G02B 6/3508 385/147 |
| 2004/0248318 A1 * | 12/2004 | Weinberger | G01N 33/54366 436/173 |
| 2004/0264847 A1 * | 12/2004 | Koh | G02B 6/3502 385/22 |
| 2005/0167508 A1 * | 8/2005 | Syms | G06K 7/10653 235/473 |
| 2005/0180678 A1 * | 8/2005 | Panepucci | G01D 5/266 385/13 |
| 2006/0127029 A1 * | 6/2006 | Lin | G02B 6/3508 385/140 |
| 2006/0275004 A1 | 12/2006 | Fujii et al. | |
| 2011/0103733 A1 * | 5/2011 | Tang | G02B 6/283 385/1 |
| 2012/0076465 A1 | 3/2012 | Chen et al. | |
| 2012/0219249 A1 | 8/2012 | Pitwon | |
| 2013/0194649 A1 * | 8/2013 | Zhou | G02B 26/023 359/230 |
| 2014/0166483 A1 * | 6/2014 | Chow | G01N 33/54373 204/451 |
| 2015/0309071 A1 * | 10/2015 | Proksch | G01Q 60/32 850/1 |
| 2016/0327751 A1 * | 11/2016 | Wu | G02B 6/3584 |
| 2018/0299622 A1 * | 10/2018 | Menard | G02B 6/00 |
| 2018/0306696 A1 * | 10/2018 | Ozdemir | G01N 15/1434 |

FOREIGN PATENT DOCUMENTS

| | | |
|---|---|---|
| JP | 2014021270 | 2/2014 |
| WO | WO-2010082524 | 7/2010 |

OTHER PUBLICATIONS

PCT/US2017/026572 International Search Report and Written Opinion dated Jun. 12, 2017, 5 pages.
PCT/US2017/040274 International Search Report and Written Opion dated Sep. 26, 2017, 17 pages.
PCT/US2017/040274 International Report on Patentability dated Jan. 10, 2019, 11 pages.

* cited by examiner

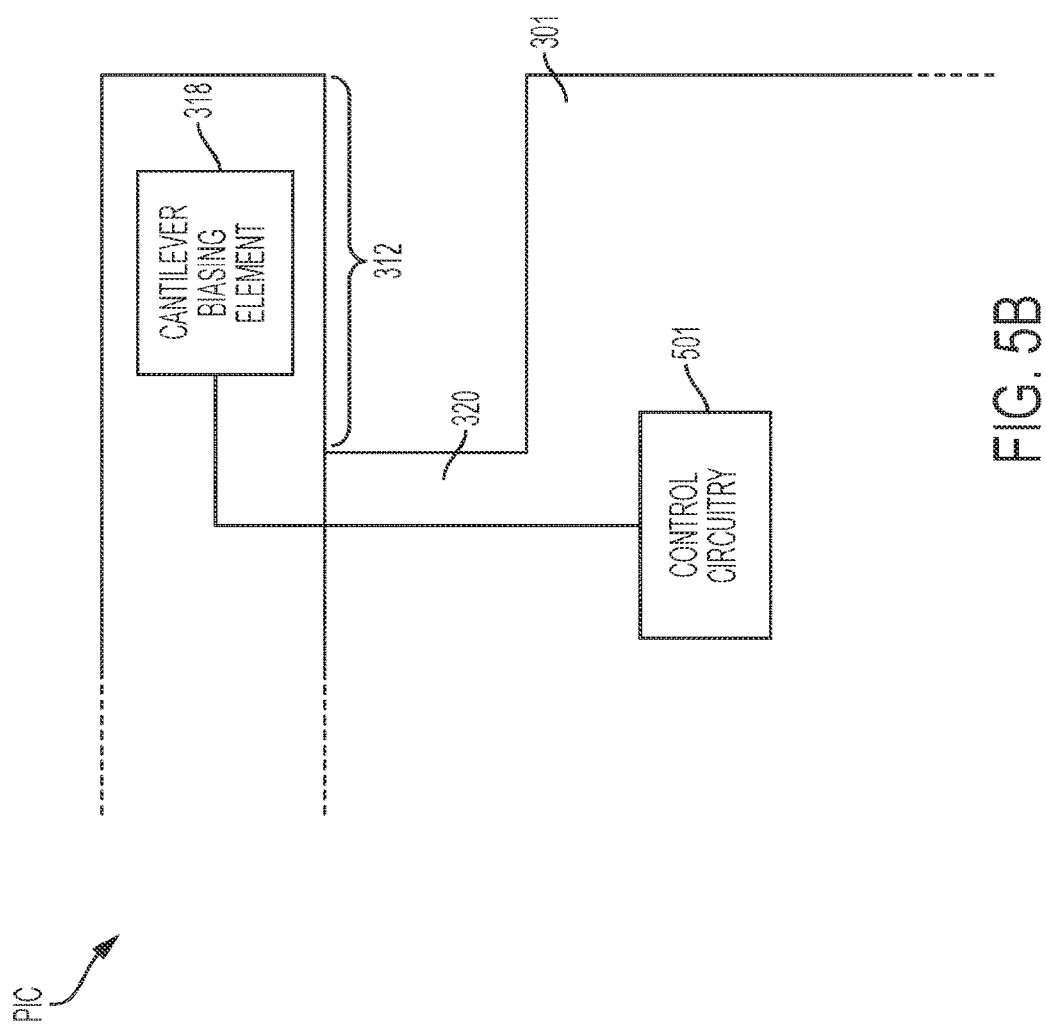

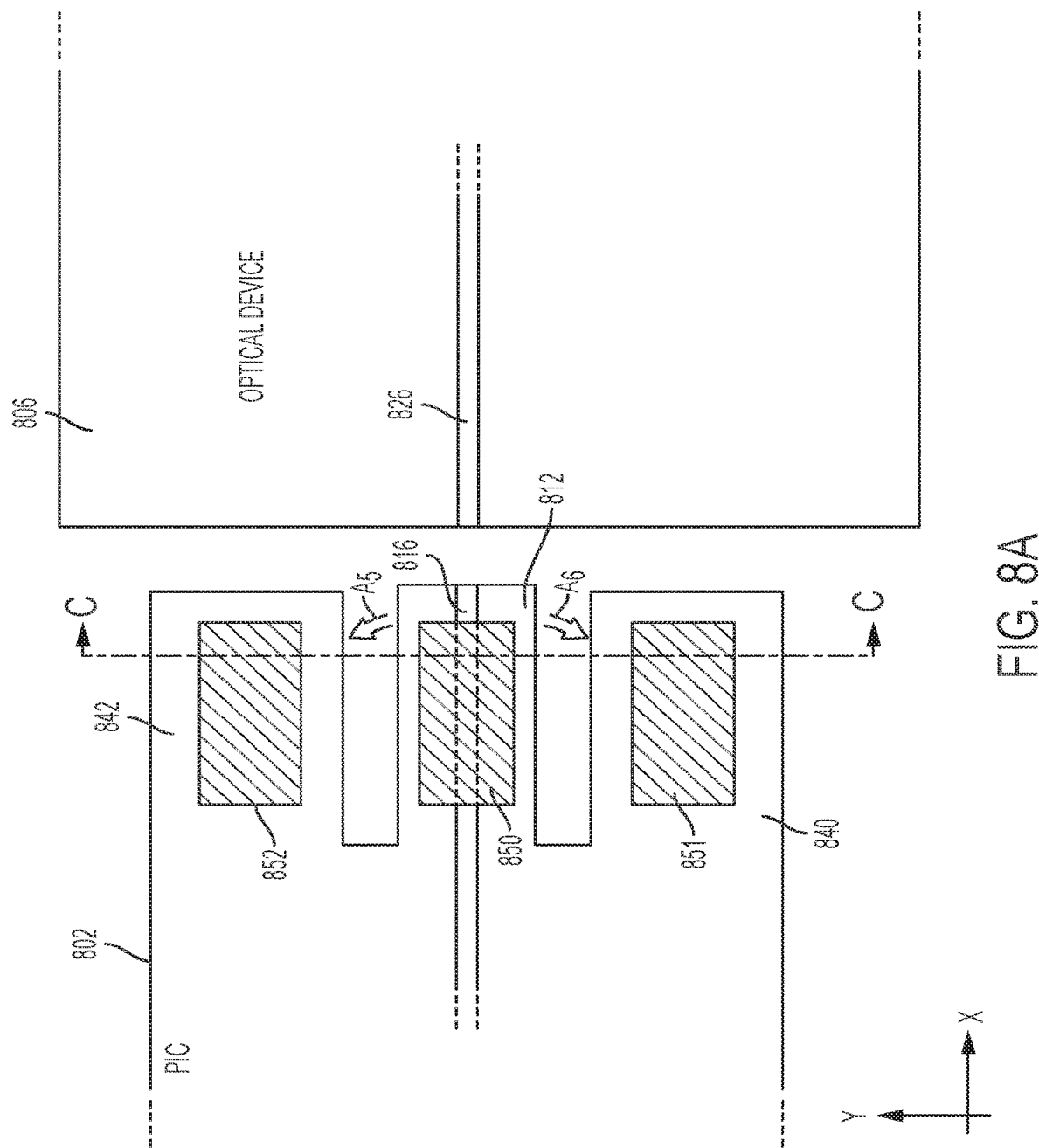

CANTILEVERS WITH ONE- OR TWO-DIMENSIONAL ACTUATION FOR ON-CHIP ACTIVE WAVEGUIDE COUPLING ALIGNMENT

CROSS REFERENCE TO RELATED APPLICATIONS AND PRIORITY CLAIM

This application is a Divisional application claiming the benefit under 35 U.S.C. § 120 of co-pending U.S. patent application Ser. No. 15/639,018, filed on Jun. 30, 2017 entitled "CANTILEVERS WITH TWO DIMENSIONAL ACTUATION FOR ON-CHIP ACTIVE WAVEGUIDE COUPLING ALIGNMENT" which is incorporated herein by reference in its entirety, which claims priority under 35 U.S.C. § 119(e) to U.S. Provisional Patent Application Ser. No. 62/357,221, entitled "CANTILEVERS WITH TWO-DIMENSIONAL ACTUATION FOR ON-CHIP ACTIVE WAVEGUIDE COUPLING ALIGNMENT," filed on Jun. 30, 2016, which is hereby incorporated herein by reference in its entirety.

BACKGROUND

Field

The present application relates to photonic integrated circuits (PIC).

Related Art

Photonic integrated circuits (PICS) are often optically coupled to other optical devices. For example, a PIC can include a first optical waveguide and a separate optical device can include a second optical waveguide. Optical coupling between the PIC and the separate optical device can be achieved by aligning the first optical waveguide to the second optical waveguide such that an optical signal is transferred between them.

BRIEF SUMMARY

According to one aspect of the present application, a photonic integrated circuit (PIC) is provided. The PIC may comprise a substrate, a cantilever having a proximal end connected to the substrate and a free end separated from the substrate by a recess, and an optical waveguide disposed, at least partially, within the cantilever, wherein the cantilever comprises a cantilever biasing element configured to spatially bias the free end of the cantilever.

In some embodiments, the free end of the cantilever is separated from the proximal end by a distance that is between 50 µm and 1 mm.

In some embodiments, the cantilever lacks support at least in a region that is within 50 µm from the free end.

In some embodiments, the cantilever biasing element is configured to spatially bias the free end of the cantilever in a direction that is out of a plane parallel to a top surface of the substrate.

In some embodiments, the cantilever comprises a first layer having a first coefficient of thermal expansion and a second layer having a second coefficient of thermal expansion, and the cantilever biasing element comprises a conductive layer.

In some embodiments, the conductive layer is disposed in the first layer.

In some embodiments, the first layer comprises silicon dioxide.

In some embodiments, the first layer is disposed between the optical waveguide and the second layer.

In some embodiments, the second layer comprises aluminum.

In some embodiments, the cantilever is bent relative to a top surface of the substrate when the cantilever biasing element is inactive.

In some embodiments, the optical waveguide has an end that is within 30 µm from the free end of the cantilever.

In some embodiments, the cantilever biasing element is configured to spatially bias the free end of the cantilever in a plane parallel to a top surface of the substrate.

In some embodiments, the PIC further comprises a first fixed portion connected to the substrate and adjacent the cantilever, the cantilever comprising a first biasing electrode and the first fixed portion comprising a second biasing electrode.

In some embodiments, the cantilever and the first fixed portion are separated from one another in a direction parallel to a top surface of the substrate.

In some embodiments, the PIC further comprises a second fixed portion comprising a third biasing electrode, the first and second fixed portions being disposed on opposite sides of the cantilever.

According to another aspect of the present application, a method is provided. The method may comprise spatially biasing a free end of a photonic integrated circuit cantilever by electrically actuating a cantilever biasing element disposed in the photonic integrated circuit cantilever, the photonic, integrated circuit cantilever having a proximal end connected to a substrate, and securing the photonic integrated circuit cantilever to an optical device disposed outside the substrate.

In some embodiments, the method further comprises coupling an optical signal between a first optical waveguide formed at least partially in the photonic integrated circuit cantilever with a second optical waveguide disposed on the optical device.

In some embodiments, securing the photonic integrated circuit cantilever to the optical device is performed in response to determining that a coupling loss between the first and second optical waveguides is less than a predefined threshold.

In some embodiments, electrically activating the cantilever biasing element comprises driving a current through a conductive layer disposed at least partially within the photonic integrated circuit cantilever.

In some embodiments, electrically activating the cantilever biasing element comprises generating a voltage between a first biasing electrode formed in the photonic integrated circuit cantilever and a second biasing electrode disposed in a fixed portion of the substrate, the fixed portion being adjacent the photonic integrated circuit cantilever.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 5B is a side view of a photonic integrated circuit illustrating a cantilever comprising a cantilever biasing element coupled to control circuitry, according to some non-limiting embodiments.

FIG. 8A is a top view illustrating a photonic integrated circuit cantilever, according to some non-limiting embodiments.

DETAILED DESCRIPTION

Figure 1B:
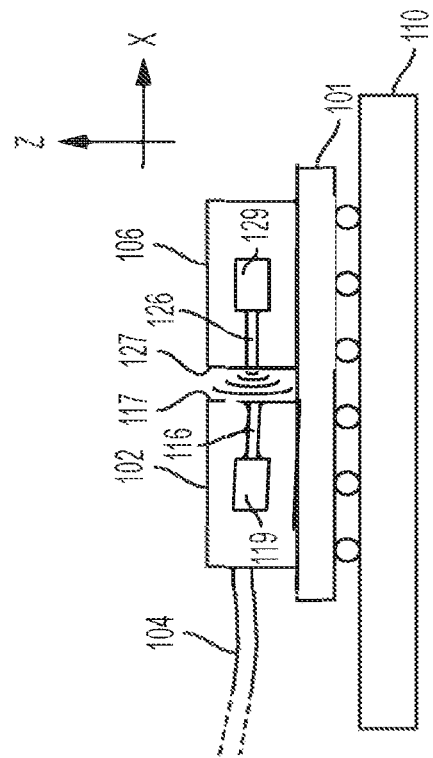
FIG. 1B is a side view illustrating an optical system comprising a photonic integrated circuit and an optical device, according to some non-limiting embodiments.

Applicant has appreciated that a challenge in the development and use of photonic integrated circuits (PICS) involves aligning waveguides of high index contrast (such as silicon waveguides) on a PIC with optical fibers or hybrid integrated waveguide chips. One manner in which to align such structures involves keeping the on-chip waveguides fixed while the optical fiber or the external chip is aligned to the waveguides on the PIC either actively or passively. Active alignment requires light passing through the coupling interface with its power monitored and optimized while the relative position between the two coupling structures (e.g., two waveguides, a waveguide and a fiber, etc.) is adjusted. Some applications call for 1-dB alignment tolerance or better, which translates to a tolerance of less than one micron.

In some scenarios, active alignment is very difficult. For example, flip-chip bonding of a semiconductor optical device to a silicon photonics chip can be a delicate process, involving use of a bonding machine and high bonding temperature. Powering up the laser at high temperature to perform the active alignment can also be difficult, thus complicating the alignment process. Passive alignment, on the other hand, relies on patterned fiducials or features on the chip for alignment. Passive alignment can involve lower cost and faster assembly procedures than active alignment, and can provide the capability to scale in high volume manufacturing. However, passive alignment relies on the precise definition of the alignment feature and the accuracy of the packaging tools, which often do not meet the tight alignment tolerance needed when coupling waveguides. This results in large optical coupling loss, large wafer location-dependent performance variation, and low yield.

Aspects of the present application provide PICS having cantilever couplers with one- or two-dimensional controlled deflection for on-chip active waveguide coupling alignment. According to an aspect of the present application, additional on-chip fine waveguide mechanical alignment is also provided using electrical control, after a fiber or a second chip is actively or passively aligned and attached to the main (or primary) chip. In some embodiments, the deflection of the cantilever is controlled electrically on-chip, and the light power passing the coupler is monitored to optimize the alignment. In at least some embodiments, no mechanical nano-positioning stages are required in the alignment process. After the alignment is optimized, the cantilevers may be, and in at least some embodiments are, permanently fixed.

The cantilevers described herein may be actuated in various ways, such as using electrostatic, thermal, piezo-electric, or magnetic actuation. For example, some embodiments use a thermal effect for the vertical (out-of-plane) deflection control of the cantilever, and use an electrostatic effect for the horizontal (in plane) deflection control of the cantilever. For vertical deflection control, the cantilever may have two layers of different materials with different coefficients of thermal expansion (CTE). As the temperature is controlled by an integrated heater, the two materials expand or contract by differing amounts, changing the deflection of the cantilever in the vertical direction. In some embodiments, for horizontal deflection control, metal electrodes are patterned on or near the cantilever. As a voltage is applied between the electrodes, the electrostatic force pulls the cantilever laterally. The two effects described in these embodiments, thermal actuation and electrostatic actuation, may not be inter-coupled, so that two dimensional actuation can be achieved.

The aspects and embodiments described above, as well as additional aspects and embodiments, are described further below. These aspects and/or embodiments may be used individually, all together, or in any combination of two or more, as the application is not limited in this respect.

Figure 1A:
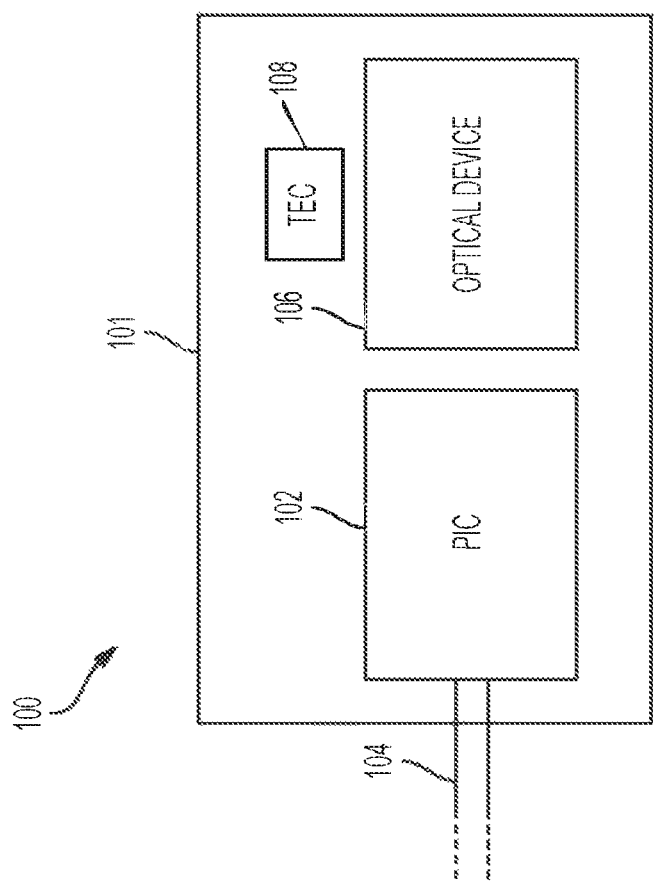
FIG. 1A is a schematic top view illustrating an optical system comprising a substrate, a photonic integrated circuit and an optical device, according to some non-limiting embodiments.

FIG. 1A is a schematic top view illustrating an optical system comprising a photonic integrated circuit and an optical device, according to some non-limiting embodiments. Optical system 100 may comprise a substrate 101, a photonic integrated circuit (PIC) 102, an optical fiber 104, an optical device 106 and, in some embodiments, a thereto-electric cooler (TEC) 108. PIC 102, optical device 106 and TEC 108 may be disposed on substrate 101, which may be formed using any of numerous materials, including but not limited to silicon, glass, or any other suitable semiconductor and/or dielectric material.

PIC 102 may comprise any suitable combination of optical elements, such as optical waveguides, optical couplers, inverse tapers, optical filters, optical modulators, optical switches, and/or photodetectors (e.g., photodiodes). In some embodiments, PIC 102 may be configured to operate as an optical transceiver. In some such embodiments, PIC 102 may be configured to operate as multi-wavelength coherent optical transceiver. As such, PIC 102 may comprise a plurality of optical modulators, for example one for each transmit communication channel, and/or a plurality of photodetectors, for example one for each receive communication channel. PIC 102 may be connected to one or more optical fibers 104, which may support optical signals that may be coupled in and/or out of the PIC 102. In some embodiments, optical fiber(s) 104 are single mode fiber(s).

Optical device 106 may comprise any type of optical element, such as one or more lasers (e.g., semiconductor lasers) and/or one or more optical amplifiers. Examples of lasers include but are not limited to distributed feedback lasers (DFBs), distributed Bragg reflector (DBR) lasers and rare-earth-doped waveguide lasers. Of course, other types of lasers may alternatively or additionally be used. TEC 108 may be thermally coupled to optical device 106 and may be configured to stabilize the temperature at which the laser(s) operate, for example to stabilize the wavelength(s) of the optical signal(s) output by the laser(s). While TEC 108 is illustrated as being disposed next to optical device 106, other configurations are also possible. For example, TEC 108 may be disposed on top of optical device 106, such that optical device 106 is between substrate 101 and TEC 108. The laser(s) of optical device 106 may output continuous wave (CW) optical signals, which may be used, for example as reference signals, by PIC 102.

In some embodiments, PIC 102 is fabricated using silicon photonics techniques. As such, PIC 102 may comprise silicon and/or silicon nitride optical waveguides. Of course, other materials and fabrication techniques can be used for PIC 102. Optical device 106 may be fabricates using silicon photonics techniques, may be made of III-V materials (e.g., indium phosphide or gallium arsenide), or may be made of any other suitable material.

Optical device 106 and PIC 102 may be optically coupled to each other, such that optical signals can be transferred from the optical device 106 to PIC 102, and/or vice versa. In the embodiments in which optical device 106 comprises one or more lasers, CW optical signals produced by the laser(s) can be coupled to PIC 102 for further processing.

For example, a CW optical signal may be provided to an optical modulator of PIC 102, and may be modulated with an electric, radio frequency (RF) signal. The modulated signal may then be transmitted out of the PIC via optical fiber(s) 104, and may be received using a photodetector disposed at the other end of the optical fiber(s). Additionally, or alternatively, a CW optical signal may serve as local oscillator signal for coherent detection schemes. As such, an optical signal received by PIC 102 via optical fiber(s) 104 can be detected by beating it with the CW optical signal, and by converting the beaten signal into the electrical domain with a photodetector.

Photodetectors have limited sensitivities due to the presence of noise; that is, optical signals with power levels below a certain minimum level cannot be discerned from noise using photodetectors. For example, some photodetectors are not able to discern noise from optical signals having power levels below −15 dBm. Such limitations in the power detectable by a photodetector can pose a limitation in the power budget of an optical link. In other words, only certain amounts of optical losses can be tolerated between a transmitter and a receiver. For this reason, it is desirable to limit optical losses along the optical link.

Among other causes, one source of optical loss arises from the fact that optical coupling between PIC 102 and optical device 106 is often less than 100%. This type of optical loss is referred to herein as "coupling loss", and can be due to, among other causes, misalignments between the PIC and the optical device.

As depicted in FIG. 1B, which illustrates a side view of a representative optical system 100, optical coupling between PIC 102 and optical device 106 can be accomplished using optical waveguides. In this arrangement, the optical coupling is referred to as "facet coupling", (or "edge coupling", or "butt coupling"), since the coupling is achieved via facet 117 of PIC 102 and facet 127 of optical device 106. As illustrated in FIG. 1B, optical signals can transferred between optical waveguide 126, formed in optical device 106 and having an end proximate to facet 127 and optical waveguide 116, formed in PIC 102 and having an end proximate to facet 117. Optical waveguide 126 may be coupled to an optical element 129, which may comprise, among other devices, one or more lasers. Optical waveguide 116 may be coupled to optical element 119, which may comprise optical couplers, inverse tapers, optical filters, optical modulators, optical switches, photodetectors, and/or other optical systems. Optical element 119 may be coupled to optical fiber(s) 104, though such optical connection is not illustrated in FIG. 1B.

In some embodiments, facets 117 and 127 are separated from one another in a direction parallel to the x-axis, as illustrated in FIG. 1B. In these embodiments, diffraction may cause the optical mode to spatially broaden as it propagates in free space. In other embodiments, facets 117 and 127 may be in contact with one another. Whether the facets are separated or not, it is desirable that optical waveguides 116 and 126 be aligned with one another in the yz-plane to limit coupling losses. In fact, any misalignment may cause part of the optical power transmitted by the transmitting optical waveguide (whether optical waveguide 116 or 126) to be reflected by the opposite facet, rather than being coupled into the receiving optical waveguide.

Some embodiments of the present application are directed to techniques for aligning the transmitting optical waveguide to the receiving optical waveguide, thereby limiting coupling losses. For example, as described in detail further below, optical waveguide 116 may have an end disposed in a controllable cantilever formed in the PIC, and the cantilever may be actively controlled to vary its orientation, thus also varying the orientation of optical waveguide 116. The term "orientation" is used herein to indicate the direction towards which an item (e.g., a cantilever or an optical waveguide) points. According to one aspect of the present application, the orientation of optical waveguide 116 may be varied to improve alignment to optical waveguide 126, thus limiting coupling losses.

As further illustrated in FIG. 1B, substrate 101 may be positioned on a substrate 110, which may be implemented, for example, as a printed circuit board. Substrate 101 may be connected to substrate 110 via ball grid arrays (BGA), metal pillars (e.g., copper pillars), through silicon vias (TSVs), or any other suitable type of connection. In some embodiments, substrate 101 may be, but need not be, part of PIC 102's handle.

Figure 2B:
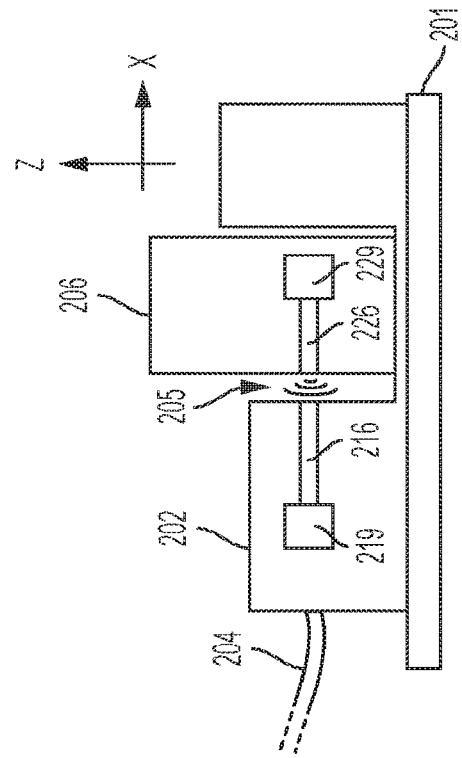
FIG. 2B is a side view illustrating an optical system comprising a photonic integrated circuit and an optical device, according to an alternative non-limiting embodiments.
Figure 2A:
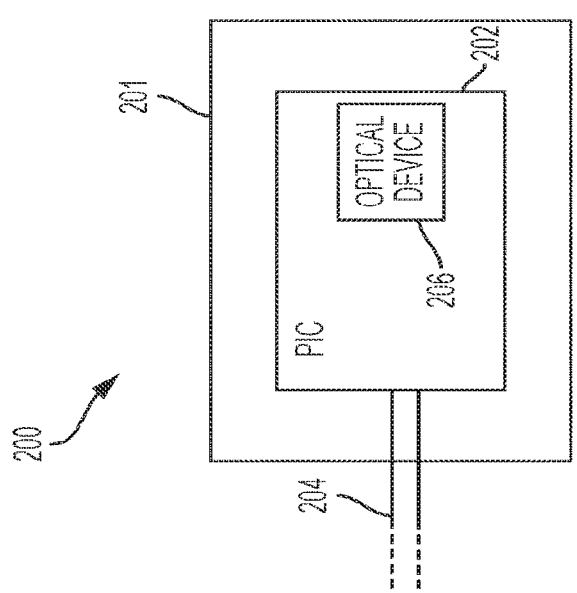
FIG. 2A is a schematic top view illustrating an optical system comprising a substrate, a photonic integrated circuit and an optical device, according to an alternative non-limiting embodiments.

FIGS. 1A-1B illustrate examples of optical systems in which the optical device is disposed beside the PIC. However, other configurations are also possible. In some embodiments, an optical device and a photonic integrated circuit may be co-integrated to form a single die. For example, an optical device may be deposited in a trench formed in the PIC. This configuration is illustrated in FIGS. 2A-2B. As depicted in FIG. 2A, optical system 200 may comprise a substrate 201, a PIC 202 (which may be connected to optical fiber(s) 204), and an optical device 206. In the embodiments in which optical device 206 comprises one or more lasers, optical system 200 may further comprise a TEC (not shown in FIG. 2A) for stabilizing the temperature of the laser(s).

As shown in FIG. 2B, optical device 206 may be placed within a trench 205 formed in PIC 202. The size of trench 205 and the geometries of PIC 202 and optical device 206 may be arranged to at least coarsely align optical waveguides 216 to optical waveguide 226. However, since the geometries of the PIC and the optical device and the size of the trench may be subjected to fabrication tolerances, optical waveguides 216 and 226 may be partially misaligned in some circumstances. The extent and direction of such misalignments may be unpredictable.

As in the case described in connection with FIG. 1B, optical waveguide 216 may be disposed at least partially in a cantilever formed in PIC 202, and the orientation of the cantilever may be controlled to improve the alignment between optical waveguides 216 and 226.

Optical waveguide 216 may be coupled to optical element 219, which may have the same characteristics as optical element 119. Optical waveguide 226 may be coupled to optical element 229, which may have the same characteristics as optical element 129.

As described above, controllable cantilevers may be used to adjust the orientation of one or more optical waveguides to improve alignment to an optical device. Adjustments in the orientation of the cantilever, and hence of the optical waveguide, may be actuated via any of numerous effects, such as electrostatic, thermal, piezoelectric and/or magnetic effects. The orientation of the cantilever may be controlled in one or two dimensions.

One representative cantilever of the type described above is illustrated in FIG. 3A. Cantilever 312, also referred to as a "photonic integrated circuit cantilever", may be formed in PIC 302 by removing (e.g., etching) a portion of the PIC. In the example illustrated in FIG. 3A, a portion of substrate 301 is removed to form a recess 314. Cantilever 312 may rest on a support 320 of substrate 301, and may be suspended over recess 314. Support 320 may be implemented as a pillar, a column, or simply as a raised portion of substrate 301. As a result, cantilever 312 may have a fixed end and a free end (the end corresponding to facet 317).

The separation, along the x-axis, between the support 320 and facet 317 may be between 50 µm and 1 mm, between 50 µm and 500 µm, between 50 µm and 300 µm, between 50 µm and 200 µm, between 100 µm and 200 µm, between 50 µm and 100 µm, or any value or range within such ranges. As used herein, the term "between" with respect to numerical ranges includes the end points of the range. For example, "between A and B" includes "A" and "B."

in some embodiments, cantilever 312 may lack mechanical supports other than support 320. In some embodiments, cantilever 312 may lack mechanical supports at least in a region that is within 50 µm, within 100 µm, within 200 µm, or within 300 µm, from the free end of cantilever 312 along the x-axis. In this way, cantilever 312 may be allowed to pivot about support 320 (in the xz-plane, as illustrated by arrows $A_1$ and $A_2$), thus enabling adjustments in the orientation of the cantilever.

Figure 3A:
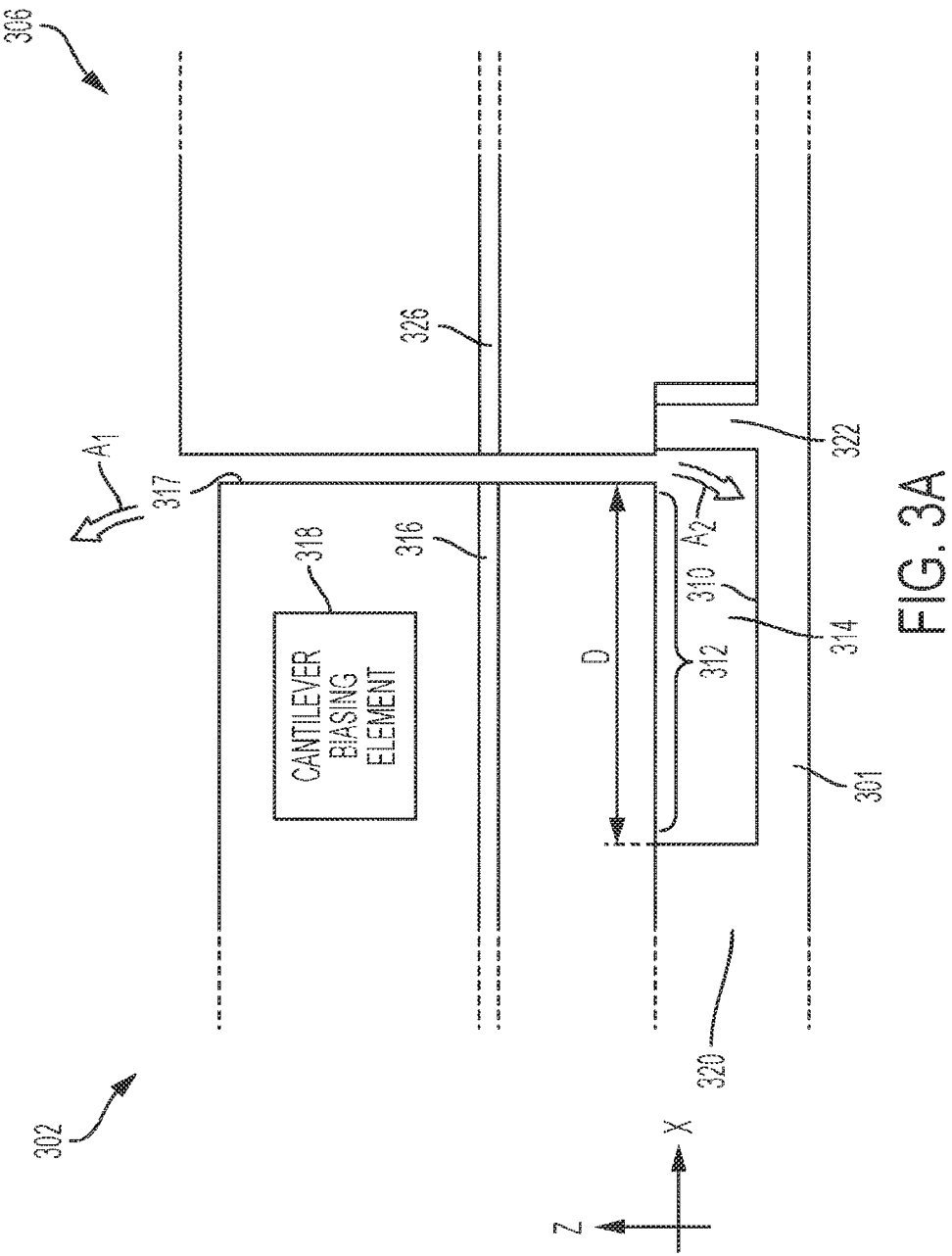
FIG. 3A is a side view of a photonic integrated circuit comprising a cantilever and an optical waveguide disposed at least partially in the cantilever, according to some non-limiting embodiments.

Optical waveguide 316 may be formed at least partially in the cantilever 312. In some embodiments, one end of optical waveguide 316, referred to herein as the distal end, is in contact with facet 317 (as illustrated in FIG. 3A). In other embodiments, the distal end of optical waveguide 316 is separated, along the x-axis, from facet 317 (for example by a distance that is less than 30 µm, less than 10 µm, less than 5 µm, or less than 1 µm).

PIC 302 may comprise a cantilever biasing element 318 for actuating cantilever 312. Cantilever biasing element 318 may actuate cantilever 312 in one or two dimensions. For example, the cantilever may be spatially biased to align optical waveguide 316 to optical waveguide 326 (formed in optical device 306) along the z-axis (also referred to herein as the vertical direction). As such, actuation of cantilever 312 using cantilever biasing element 318 may cause the cantilever to deflect by pivoting about support 320. In this way, the height (along the z-axis) of the distal end of optical waveguide 316 measured from the top surface 310 of substrate 301 may be adjusted. Cantilever biasing element 318 may be configured to actuate cantilever 312 using electrostatic, thermal, piezoelectric and/or magnetic effects, and may comprise one or more electrodes, heaters, or other actuating devices or circuits.

As further illustrated in FIG. 3A, a portion of optical device 306 may rest on a pillar 322, formed on the top surface 310 of substrate 301. The geometries of the pillar 322 and optical device 306 may be designed to provide coarse alignment between optical waveguides 316 and 326.

Figure 3B:
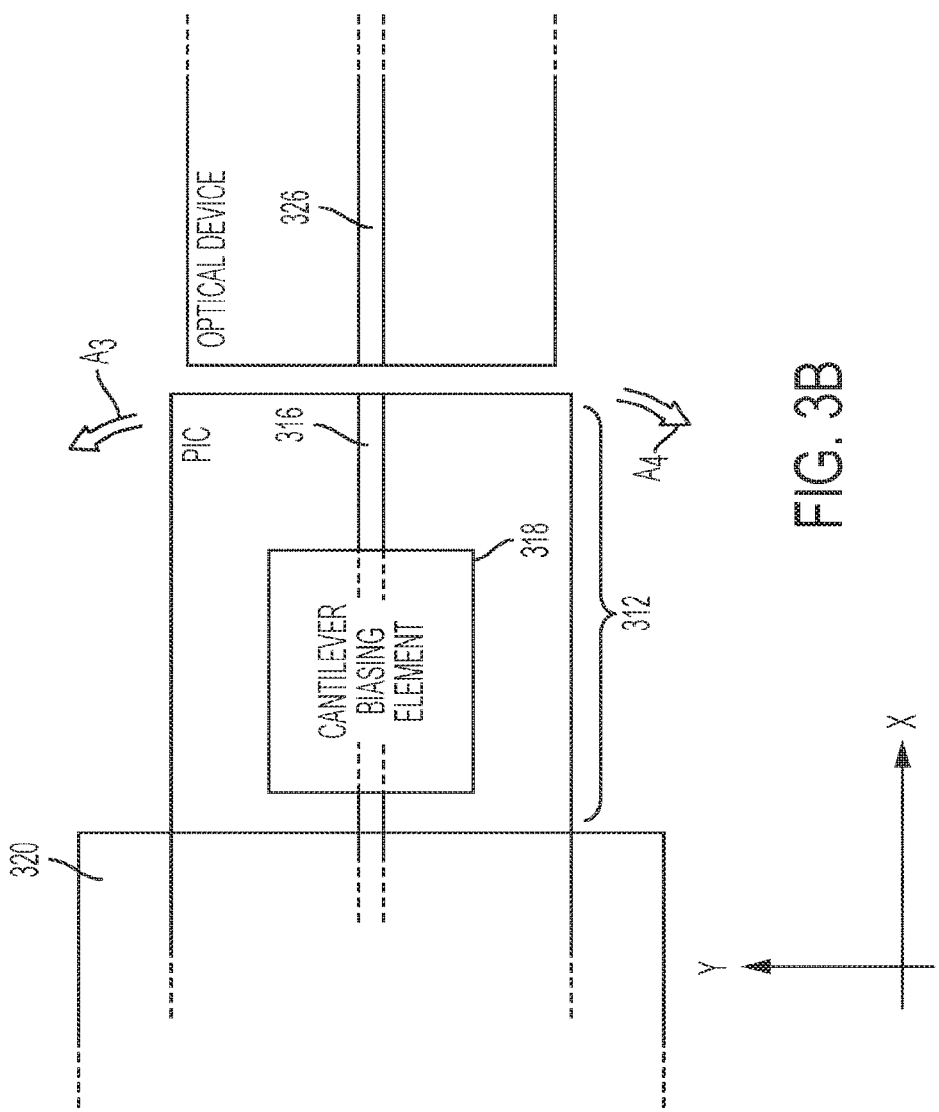
FIG. 3B is a top view of a photonic integrated circuit comprising a cantilever and an optical waveguide disposed at least partially in the cantilever, according to some non-limiting embodiments.

In addition or in alternative to biasing cantilever 312 in the vertical direction, the cantilever may be biased along the lateral direction (along the y-axis). Biasing of the cantilever in the lateral direction may be accomplished using cantilever biasing element 318. In this way, lateral alignment in the y-axis between waveguides 316 and 326 may be achieved. A configuration for laterally biasing a cantilever is depicted in FIG. 3B. In this configuration, cantilever 312 may be free to pivot in the xy-plane (as illustrated by arrows $A_3$ and $A_4$).

Figure 4:
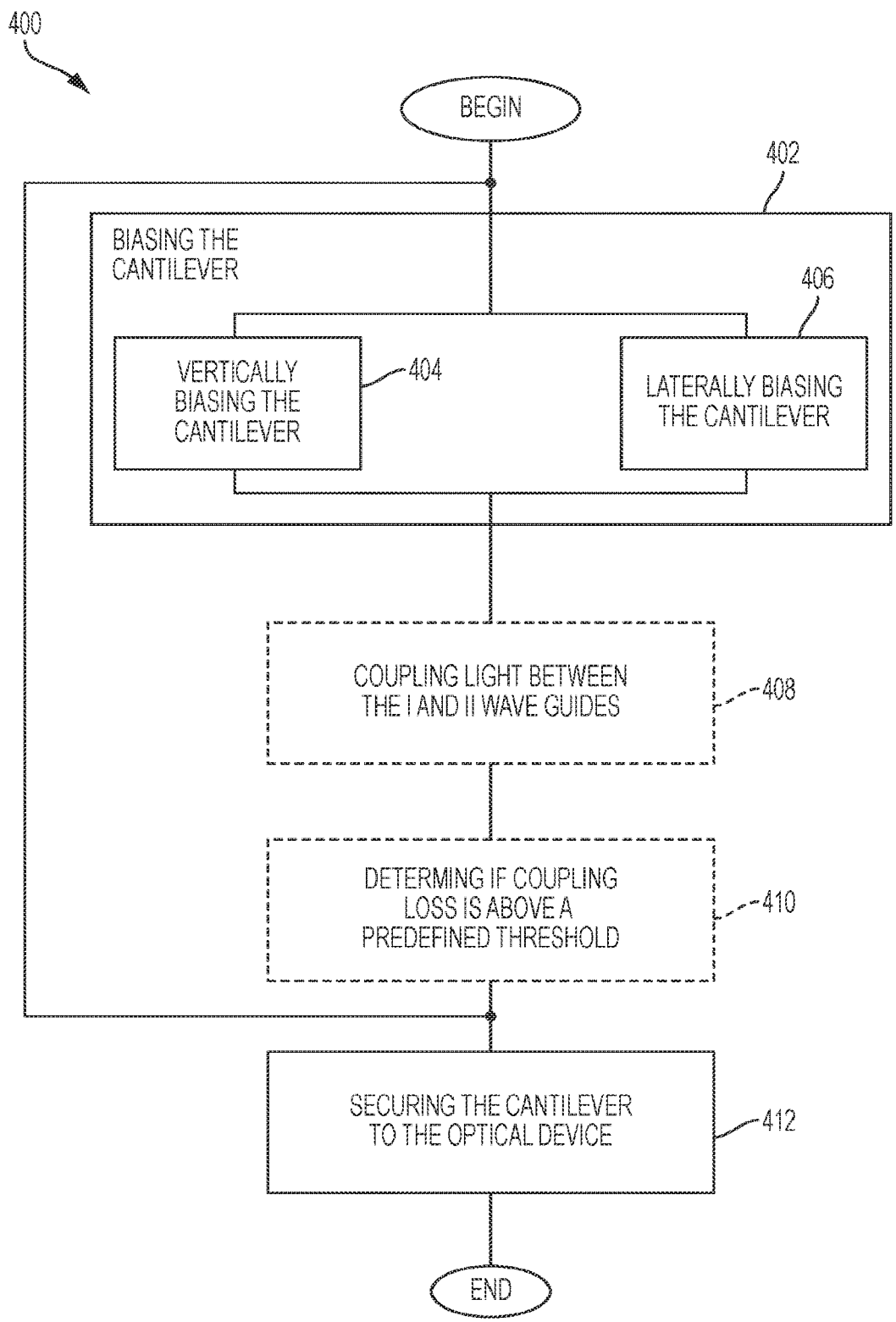
FIG. 4 is a flowchart illustrating a method for optically aligning a photonic integrated circuit to an optical device, according to some non-limiting embodiments.

A representative method for optically aligning a PIC to an optical device, such as a laser chip, an optical fiber or another PIC, is depicted in FIG. 4. Method 400 may begin at act 402, in which a cantilever formed in a PIC is spatially biased. Biasing of the cantilever may be accomplished by actuating the cantilever using a cantilever biasing element. Biasing of the cantilever causes the distal end of the optical waveguide disposed in the cantilever to be oriented in a desired direction. As part of act 402, the cantilever may be vertically biased (in act 404) and/or laterally biased (in act 406).

Optionally, an optical signal may be coupled between a first waveguide, disposed in the optical device, and a second waveguide, disposed in the PIC (in act 408). The power level of the coupled optical signal may be monitored, for example using a photodetector, thereby monitoring the coupling loss between the first and second optical waveguides. In this way, the alignment between the first and second optical waveguides may be monitored.

Optionally, the coupling loss between the first and second optical waveguides may be quantified (in act 410), and, if the coupling loss is greater than a predefined threshold (e.g., 3 dB or 1 dB), the cantilever may be re-biased, and method 400 may return to act 402.

Method 400 may then proceed to act 412, in which the cantilever is secured to optical device. In the embodiments in which act 410 is performed, securing of the cantilever to the optical device may be performed if it is determined that the coupling loss is below the predefined threshold. Securing the cantilever to the optical device may fix, at least temporarily, the relative position of the first optical waveguide relative to the second optical waveguide. Act 412 may be performed only once, thus permanently fixing the cantilever to the optical device, or multiple times throughout the lifetime of the optical system.

Figure 5A:
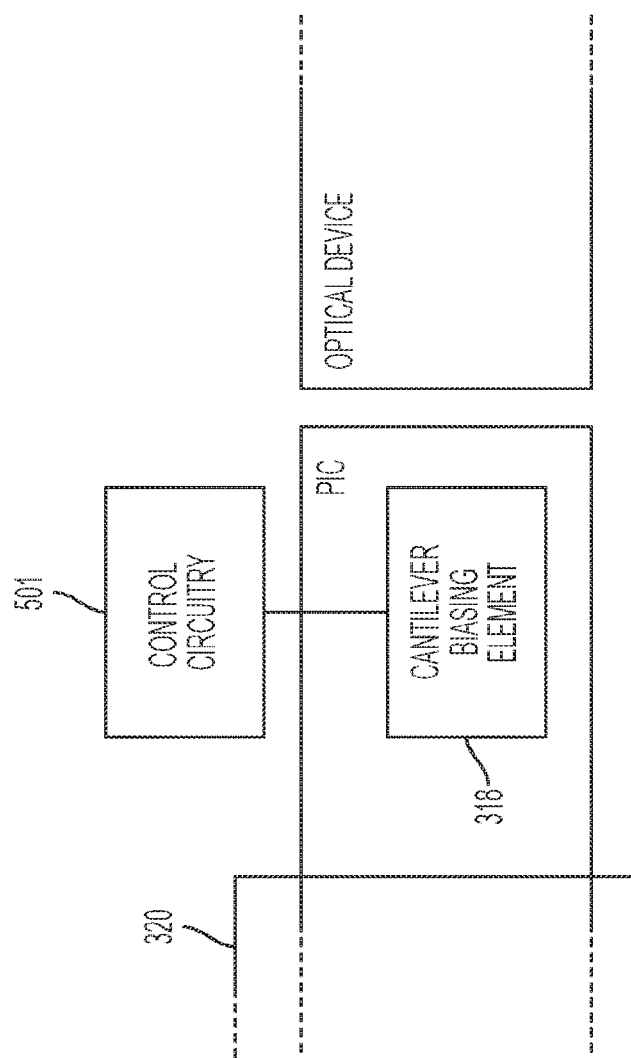
FIG. 5A illustrates schematically a cantilever comprising a cantilever biasing element coupled to control circuitry, according to some non-limiting embodiments.
Figure 5C:
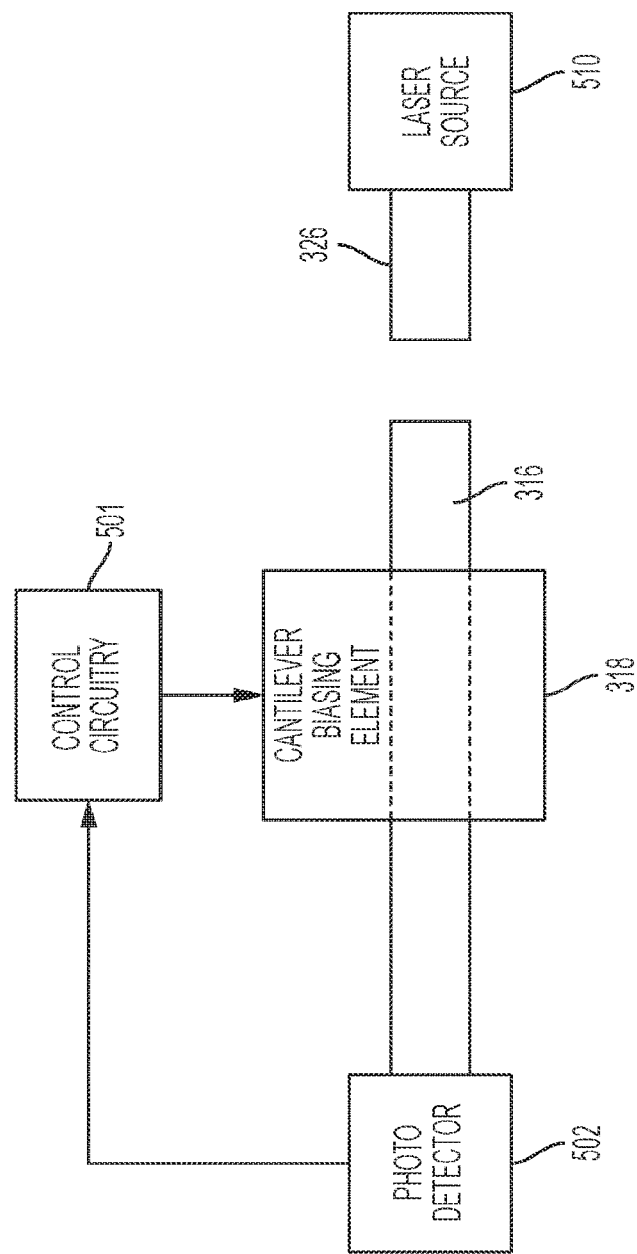
FIG. 5C is a block diagram illustrating schematically a feedback loop as may be used to control the orientation of a photonic integrated circuit cantilever, according to some non-limiting embodiments.

To determine whether the coupling loss is greater than the predefined threshold, control circuitry 501 may be used. Control circuitry 501 may be coupled to the cantilever biasing element, and may be disposed outside the PIC (as depicted in FIG. 5A), or may, be part of the PIC (as depicted in FIG. 5B). For example, control circuitry 501 may be disposed in substrate 301. Control circuitry 501 may include a memory having a value stored therein indicative of the predefined threshold, and may include a circuit to perform a comparison between the measured coupling loss and the predefined threshold. Based on the result of the comparison, control circuitry 501 may produce a signal for controlling cantilever biasing element 318. Control circuitry 501 may be part of a feedback loop configured to adjust the orientation of the cantilever until the coupling loss is below the predefined threshold. On such feedback loop is depicted in FIG. 5C.

In this configuration, a laser source, disposed for example in optical device 306, may generate an optical signal, such as a CW optical signal. The optical signal may be edge coupled between optical waveguide 326 and optical waveguide 316. The power level of the optical signal received by optical waveguide 316 may be sensed using a photodetector 502, which may be implemented using a photodiode. Information indicative of the sensed power level may be provided to control circuitry 501, which may compute the coupling loss. If the control circuitry determines that the coupling loss is above the predefined threshold, cantilever biasing element 318 may be re-biased, thus varying the orientation of the distal end of optical waveguide 316. The process may continue until control circuitry 502 determines that the sensed power level is within an acceptable range.

Figure 6A:
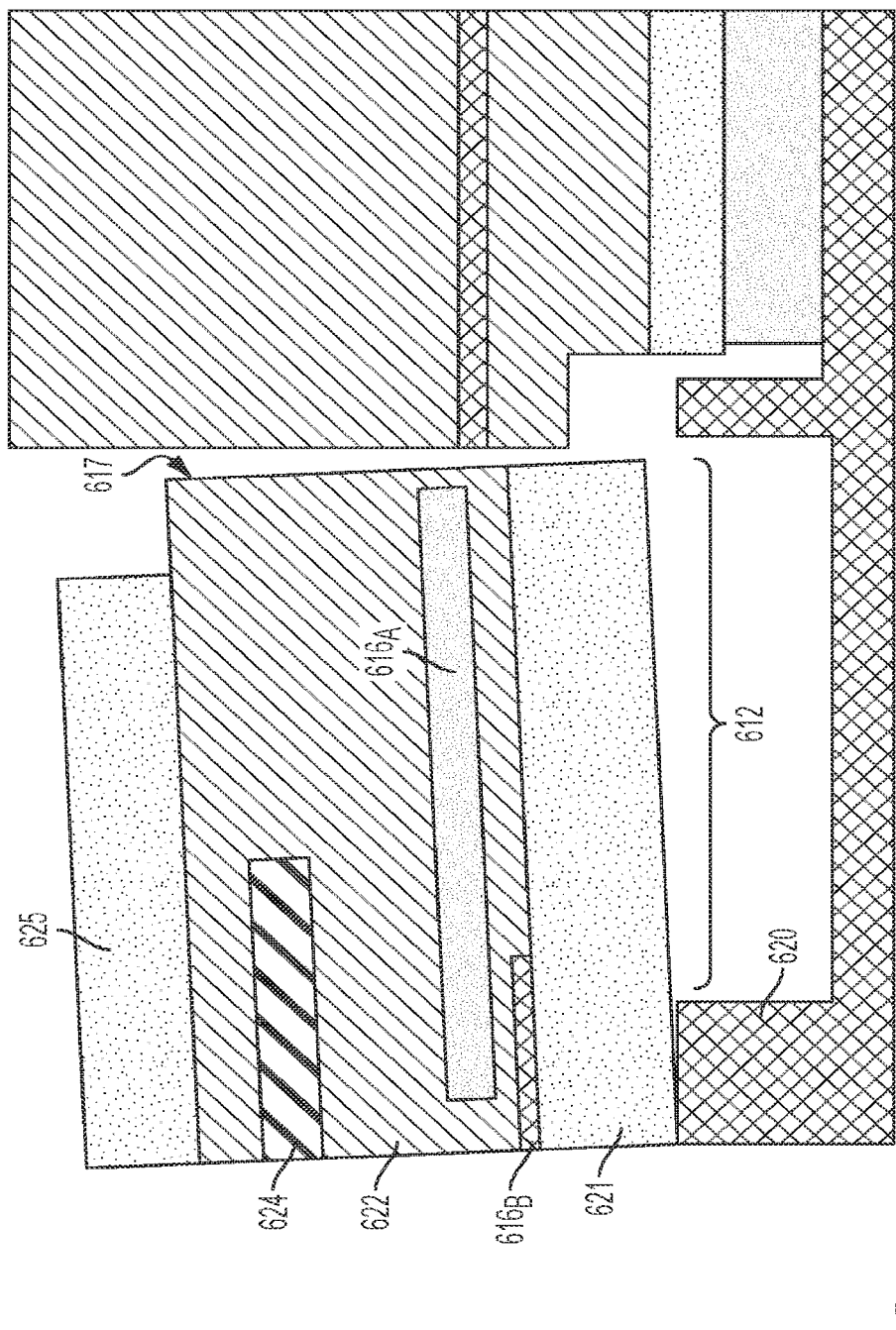
FIGS. 6A-6C are side views of a photonic integrated circuit illustrating a representative sequence for optically aligning, along a vertical direction, a photonic integrated circuit to an optical device, according to some non-limiting embodiments.

As described above, cantilever biasing element 318 may be implemented to actuate the cantilever electrostatically, thermally, piezoelectrically and/or magnetically. In some embodiments, vertical biasing of the cantilever may be achieved via thermal effects. The cantilever biasing element, also referred to in these embodiments as a "stressor" or "forcer", may comprise a heater. One such configuration is illustrated in FIG. 6A, in which cantilever 612 may comprise a buried oxide 621 (serving as lower cladding), one or more optical waveguides, such as optical waveguides $616_A$ and $616_B$, a first layer 622 (serving as upper cladding), a conductive layer 624 (serving as a heater), and a second layer 625. In some embodiments, the first layer 622 comprises a glass, such as silicon dioxide or other dielectric materials. Second layer 625 may be formed on top of first layer 622.

In some embodiments, first layer 622 and second layer 625 have different coefficients of thermal expansion (CTE). As a result, mechanical stress may arise near the interface between the first and second layers. For example, in the embodiments in which the CTE of the second layer is greater than the CTE of the first layer, residual compressive stress may arise in the second layer near the interface. As a result, the cantilever may bend upwards (away from the top surface of the substrate), by pivoting about support 620.

In some embodiments, the first layer comprises silicon dioxide. In some embodiments, the second layer comprises aluminum. In the embodiments in which the first layer comprises silicon dioxide and the second layer comprises aluminum, the CTE of the first layer may be less than $10^{-6}$ $K^{-1}$ (at room temperature), and the CTE of the second layer may be greater than $20 \times 10^{-6}$ $K^{-1}$ (at room temperature). Of course, other materials can alternatively be used for the first and second layers, so lone as the CTEs are different at room temperature.

Figure 6B:
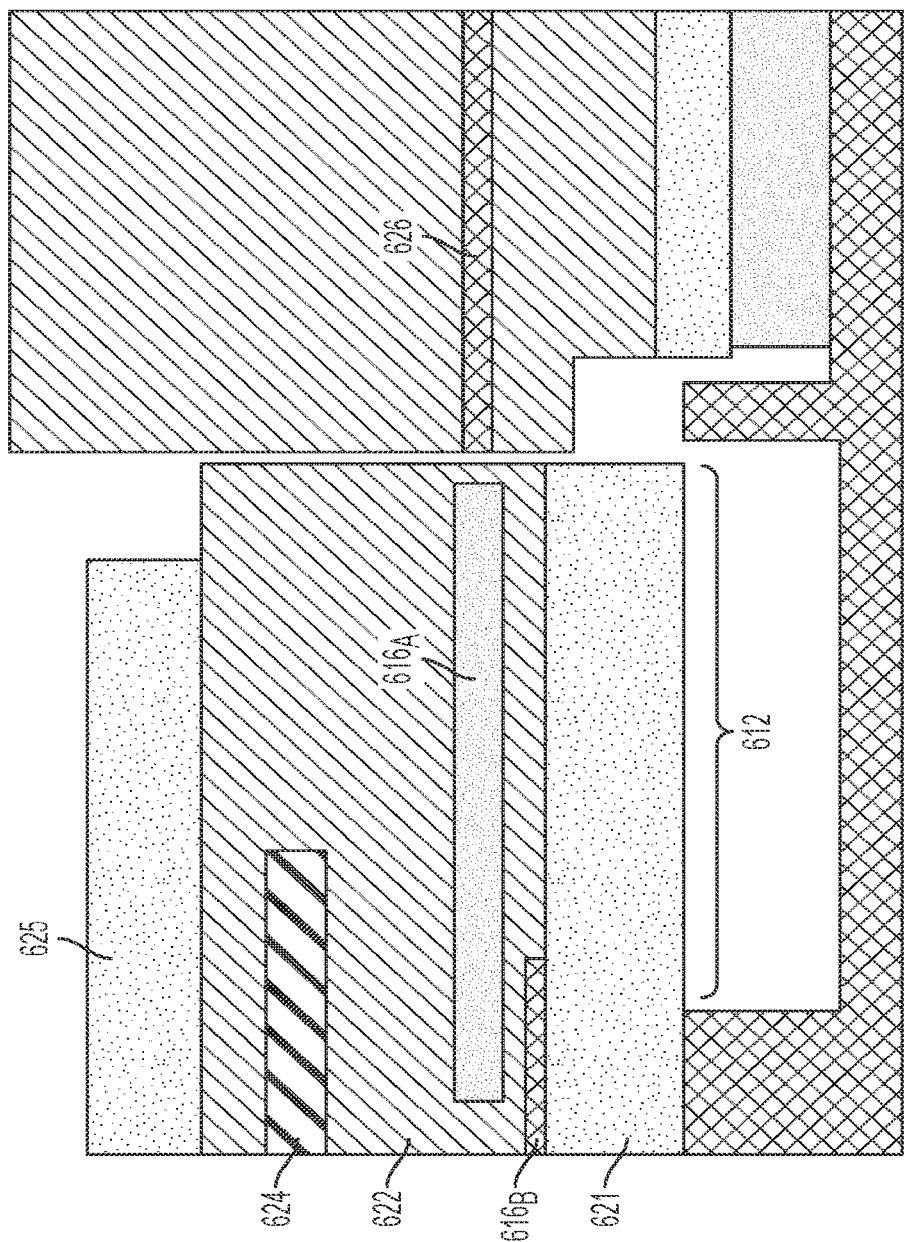

To actively control the orientation of the cantilever, the cantilever biasing element may comprises a heater, which may be implemented as conductive layer 624. Conductive layer 624 may be disposed within first layer 622 in some embodiments. Conductive layer 624 may be connected to a pair of electrodes, and upon application of a voltage between the electrodes, a current may flow in the conductive layer. As a result, the temperature of the conductive layer and the temperature of a region of the first layer near the conductive layer may increase. When the region of the first layer increases in temperature, the first layer may expand to a greater extent relative to the second layer. As a consequence, the compressive stress in the second layer may be reduced and the cantilever may bend downwards. This configuration is illustrated in FIG. 6B. The current flowing in the conductive layer may be adjusted, for example using control circuitry 501, until optical waveguide $616_B$ is vertically aligned to optical waveguide 626.

While FIGS. 6A-6B illustrate a configuration in which the second layer has a CTE that is greater than that of the first layer, and as a result the cantilever bends upwards when no voltage is applied to the conductive layer, the opposite configuration is also possible. In the opposite configuration, the heater may be disposed in the second layer.

Conductive layer 624 may be implemented using any of numerous materials, including titanium nitride, nickel and/or chrome. The conductivity of the material(s) used for the conductive layer may be sufficiently large to cause substantial variations in temperature when a voltage is applied to the electrodes, but may be sufficiently small to prevent electron.

For example, the conductivity of the material used for the conductive layer may be between $10^4$ S/m and $10^8$ S/m.

Figure 6C:
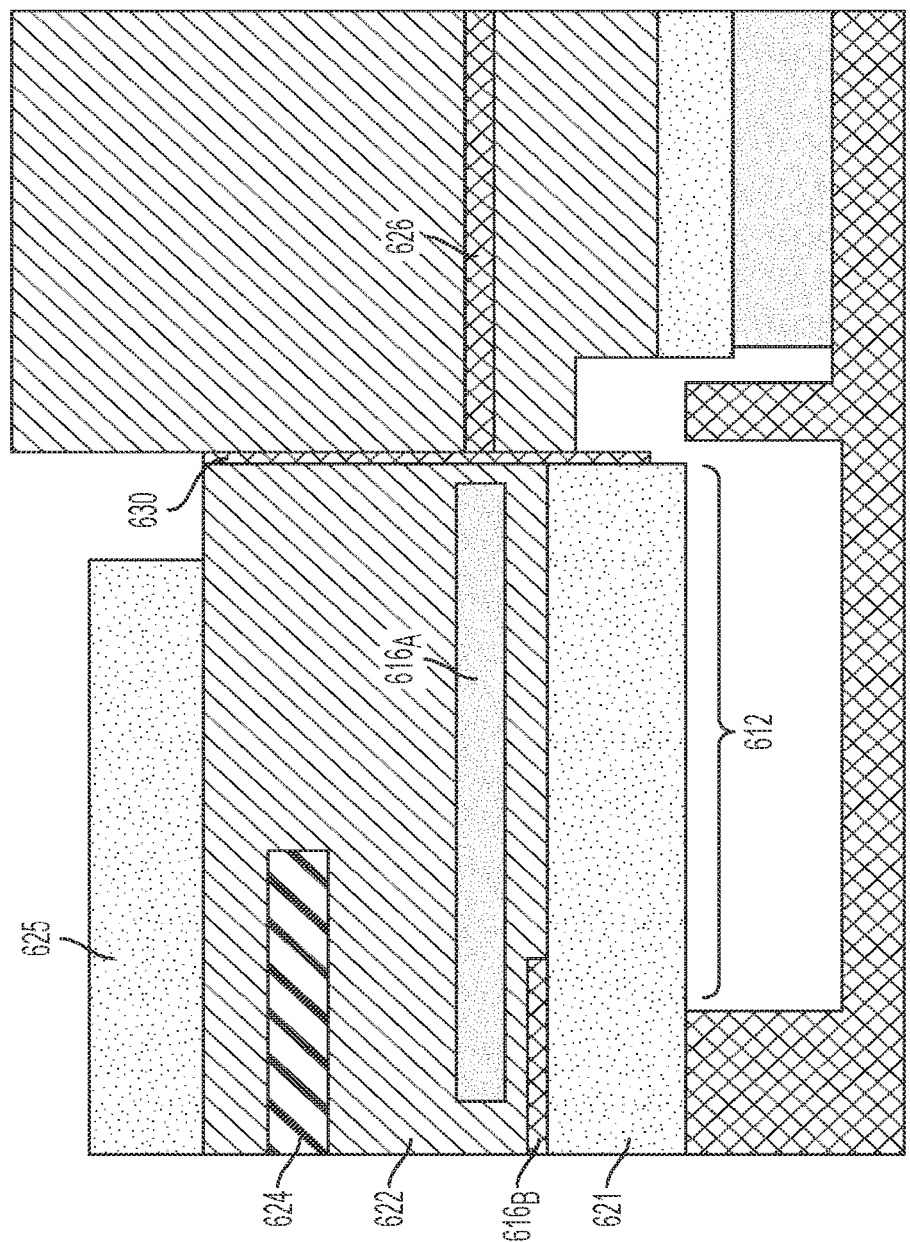

When it is determined that optical waveguides 616B and 626 are aligned (for example by determining that the coupling loss is below the predefined threshold), cantilever 612 may be secured to the optical device, as illustrated in FIG. 6C. For example, in some embodiments, cantilever 612 may be attached to the optical device using epoxy 630 or other gluing materials. Once the cantilever has been secured, the optical waveguides may remain aligned even if the current in the conductive layer is turned off.

FIGS. 6A-6C illustrate a pair of optical waveguides $616_A$ and $616_B$ disposed in the cantilever. Using two optical waveguides rather than one may increase the overall coupling efficiency in/out of the PIC. In one example, optical waveguide $616_A$ may comprise a silicon core, and optical waveguide $616_A$ may comprise a core having a refractive index lower than that of silicon (e.g., silicon nitride). In this way, the mode of the optical waveguide $616_A$ is less confined relative to that of optical waveguide $616_B$, and the overall coupling in/out of the PIC is facilitated. As a drawback, this configuration requires the formation of two separate guiding layers, which may render the fabrication process more complex. In alternative, only one guiding layer, such as silicon, may be used.

Figure 7C:
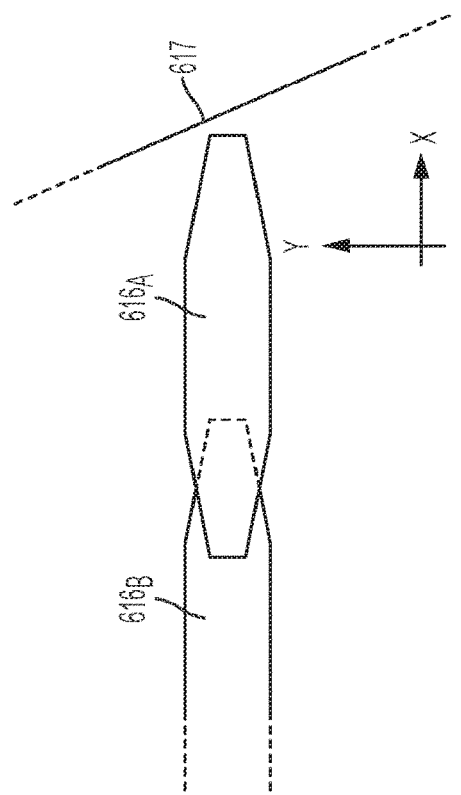
FIG. 7C is a schematic top view illustrating a portion of a photonic integrated circuit comprising a pair of adiabatic inverse tapers and an angled coupling facet, according to some non-limiting embodiments.
Figure 7D:
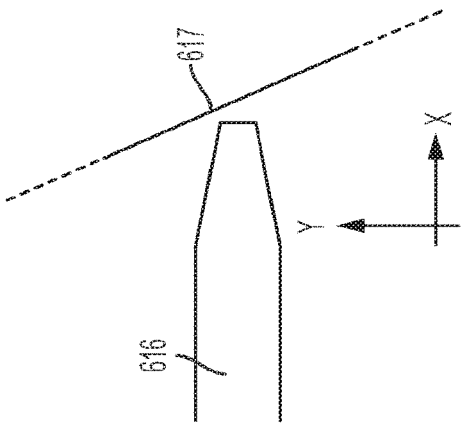
FIG. 7D is a schematic top view illustrating a portion of a photonic integrated circuit comprising an optical waveguide and an angled coupling facet, according to some non-limiting embodiments.
Figure 7A:
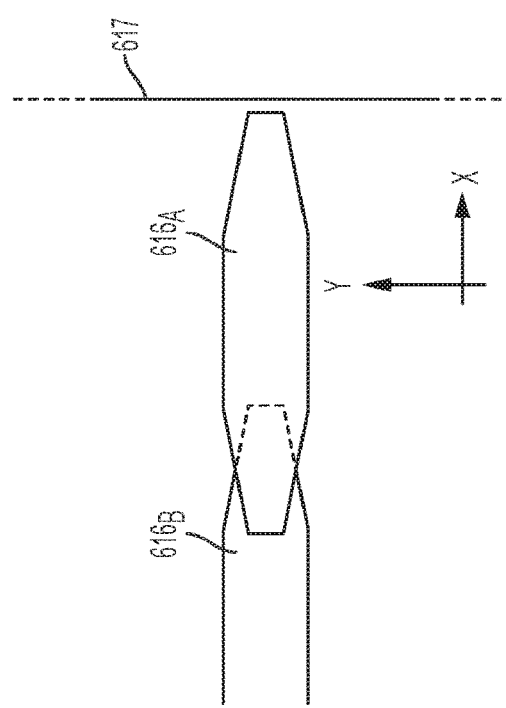
FIG. 7A is a schematic top view illustrating a portion of a photonic integrated circuit comprising a pair of adiabatic inverse tapers and an orthogonal coupling facet, according to some non-limiting embodiments.

Various optical waveguide arrangements for the PIC are illustrated in FIGS. 7A-7D. The configuration of FIG. 7A illustrates a pair of optical waveguides $616_A$ and $616_B$. The two optical waveguides may be disposed on different xy-planes (as shown in FIG. 6C). Optical waveguide $616_B$ is disposed proximate to the facet 617, and may be tapered in proximity to the facet 617 to improve modal overlap relative to optical waveguide 626. The other end of the optical waveguide $616_A$ may be tapered to facilitate coupling to optical waveguide $616_B$. To further facilitate coupling, the end of optical waveguide $616_B$ closer to optical waveguide $616_A$ may be tapered.

Figure 7B:
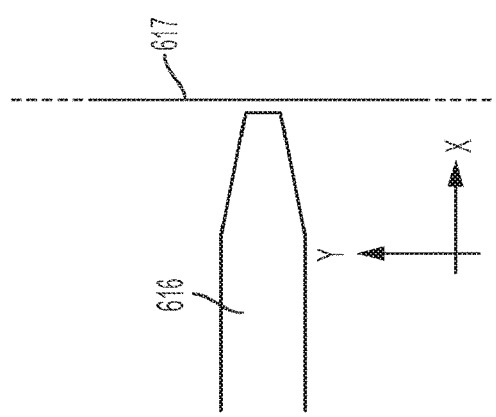
FIG. 7B is a schematic top view illustrating a portion of a photonic integrated circuit comprising an optical waveguide and an orthogonal coupling facet, according to some non-limiting embodiments.

In contrast, the configuration illustrated in FIG. 7B comprises a single optical waveguide 616.

In some embodiments, to limit optical reflections arising against it, facet 617 may be angled relative to the y-axis. FIG. 7C illustrates an angled facet used in connection with a pair of optical waveguides $616_A$ and $616_B$, and FIG. 7D illustrates an angled facet used in connection with a single optical waveguide 616.

Figure 8B:
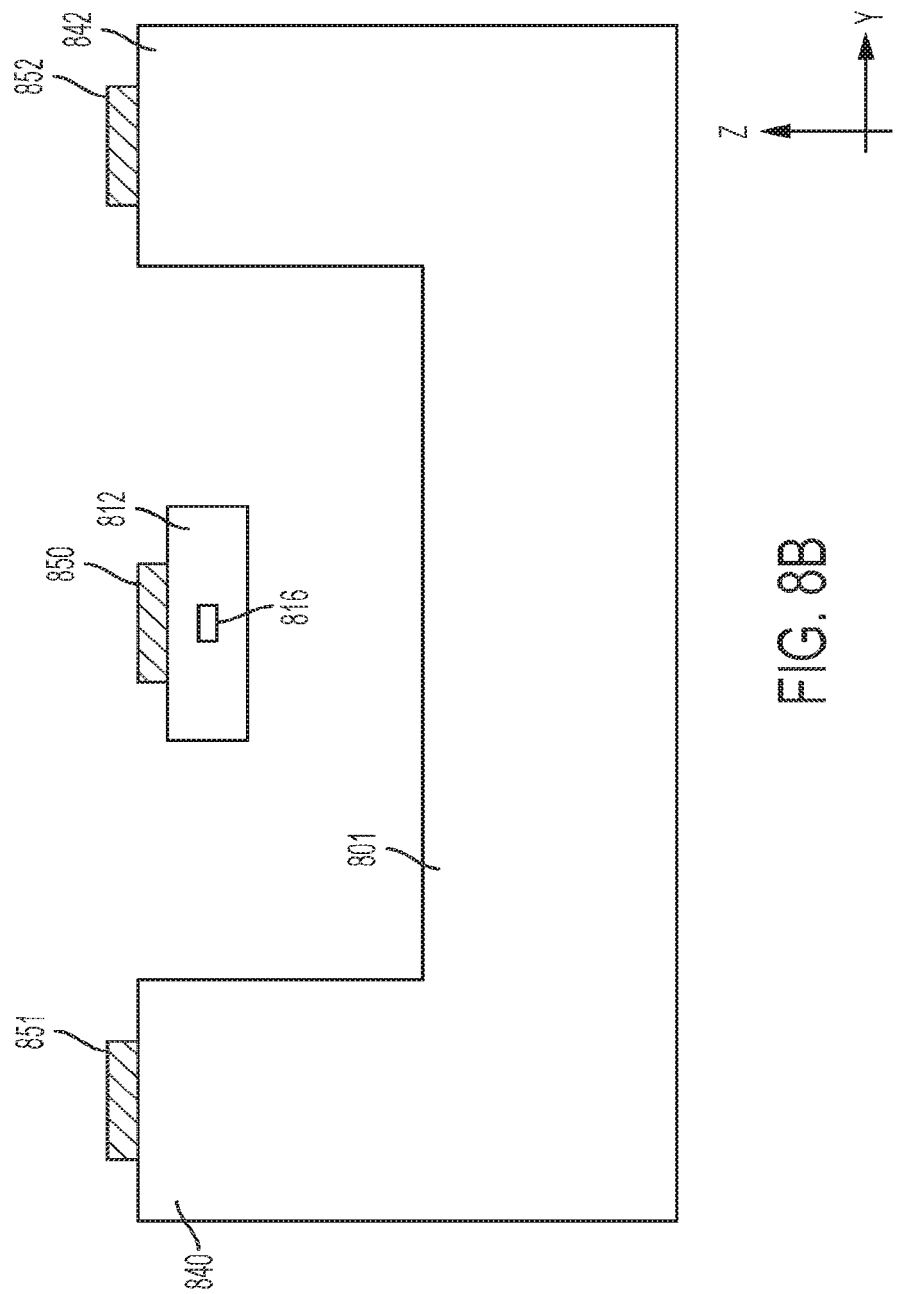
FIG. 8B is a cross sectional view of the photonic integrated circuit of FIG. 8A taken along the CC line, according to some non-limiting embodiments.

As described above, cantilevers of the types described herein may be biased in one or two dimensions. FIGS. 8A-8E are examples illustrating how a cantilever can be biased in the lateral direction. FIG. 8A illustrates a PIC 802 having a cantilever 812 and fixed portions 840 and 842. Cantilever 812 may be suspended over the substrate as illustrated in FIG. 3A, and the fixed portions may be attached to the substrate (for example, the fixed portions may include pillars, posts of raised portions of the substrate). A cross sectional view of PIC 802 taken along the CC line is depicted in FIG. 8B. As illustrated, cantilever 812 is suspended above the substrate 801 and fixed portions 840 and 842 are connected to the substrate 801.

Referring back to FIG. 8A, cantilever 812 may be deflected as illustrated by the arrows $A_5$ and $A_6$ using electrostatic forces. For example, electrodes 850, 851, and 852 may be formed on the cantilever 812 and fixed portions 851 and 852, respectively, and may be used to generate attractive and/or repulsive forces upon application of voltages. Electrode 850 may serve as cantilever biasing element 318.

In some embodiments, when electrode 852 is brought to a potential that is different than (e.g., greater or lower) that of electrode 850, an attractive force is generated and cantilever 812 deflects towards fixed portion 842. Similarly, when electrode 851 is brought to a potential that is different than (e.g., greater or lower) that of electrode 850, an attractive force is generated and cantilever 812 deflects towards fixed portion 840. As a result, the distal end of optical waveguide 816 may be re-oriented, thus providing a way for laterally aligning the optical waveguide 816 to optical waveguide 826. In some embodiments, electrode 850 may be implemented using second layer 625. In some embodiments, when a voltage is applied between electrodes 850 and 852, electrode 851 may be floating. Additionally or alternatively, when a voltage is applied between electrodes 850 and 851, electrode 852 may be floating.

Figure 8C:
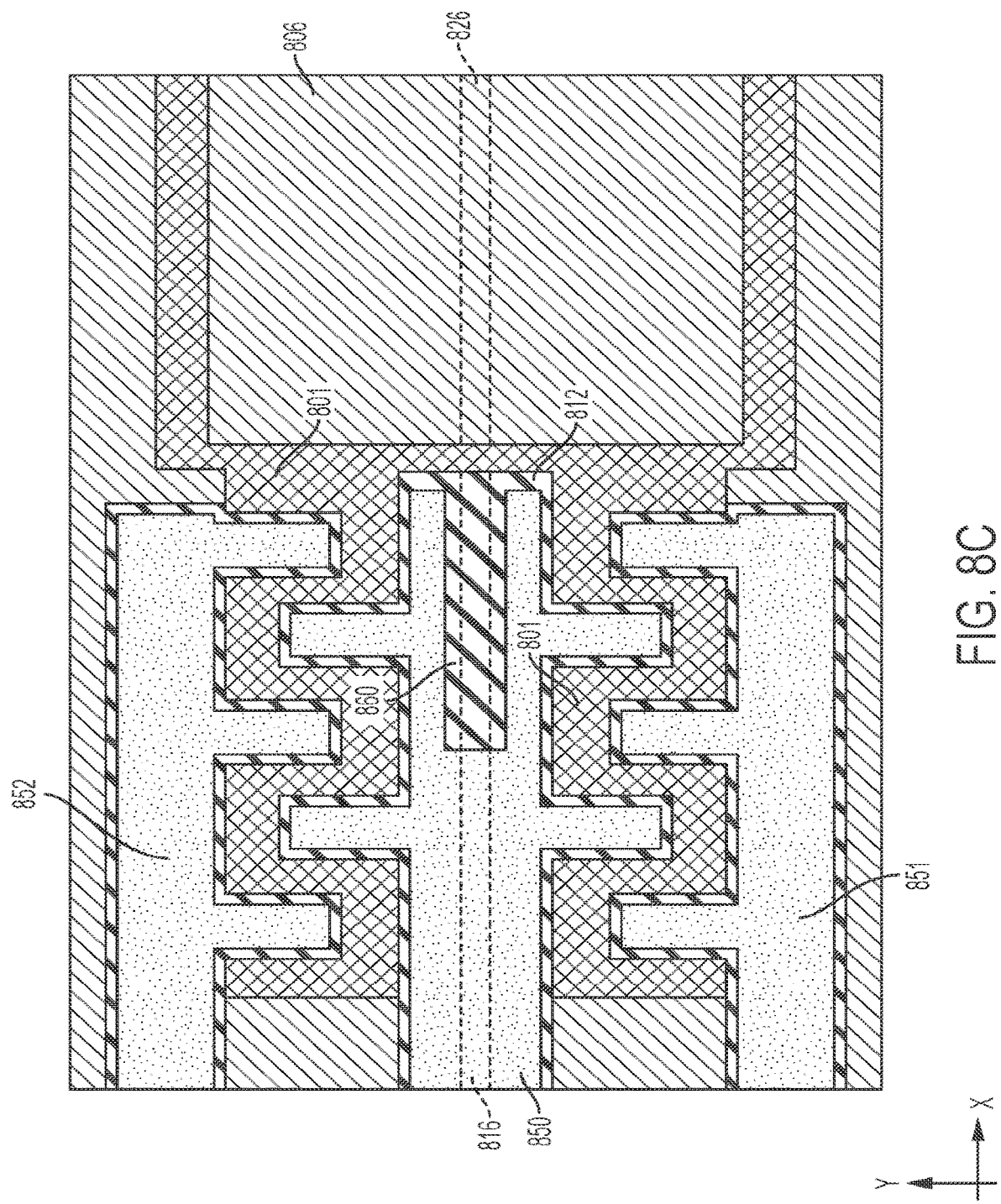
FIGS. 8C-8E are top views illustrating a representative sequence for optically aligning, along a lateral direction, a photonic integrated circuit to an optical device, according to some non-limiting embodiments.
Figure 8D:
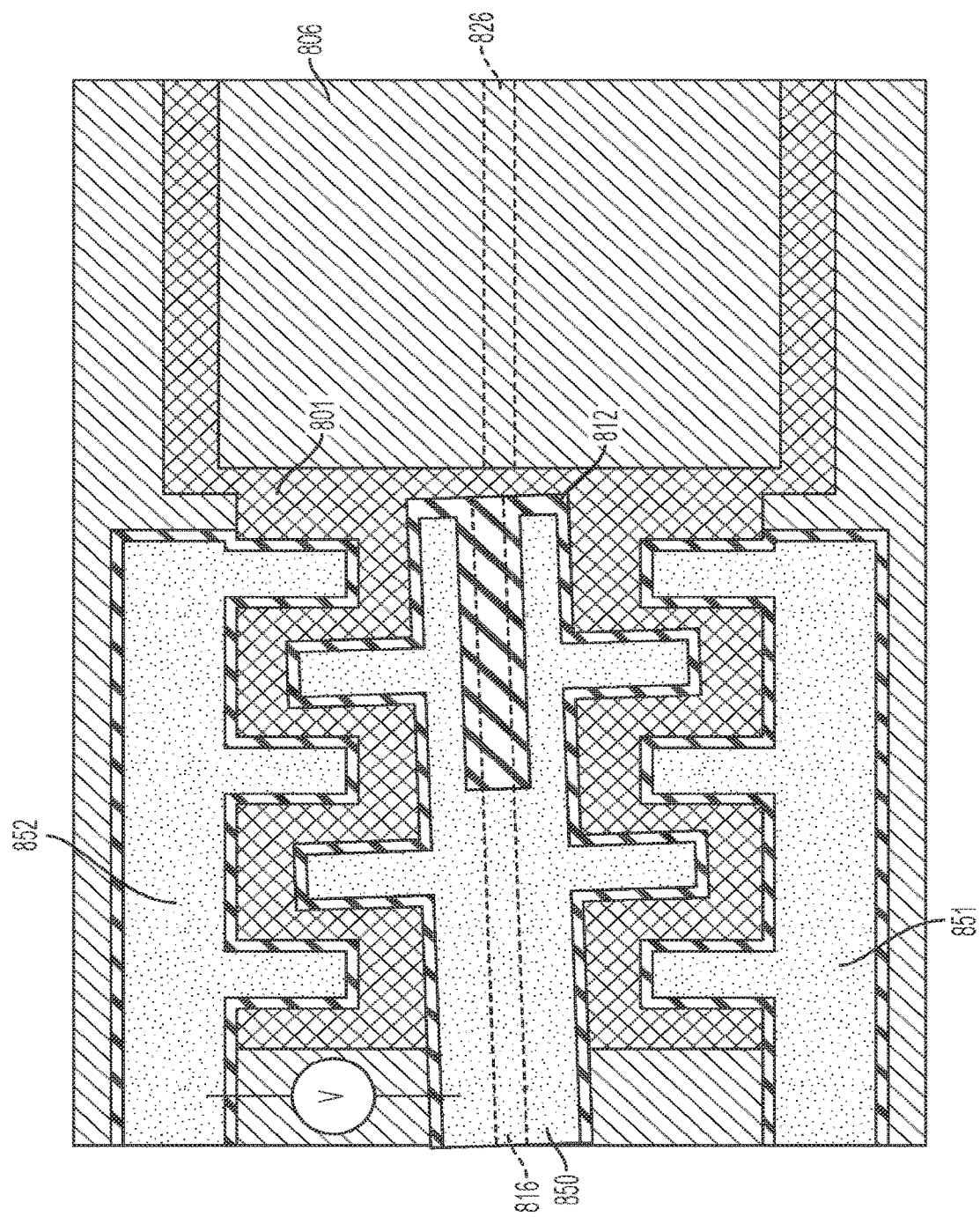
Figure 8E:
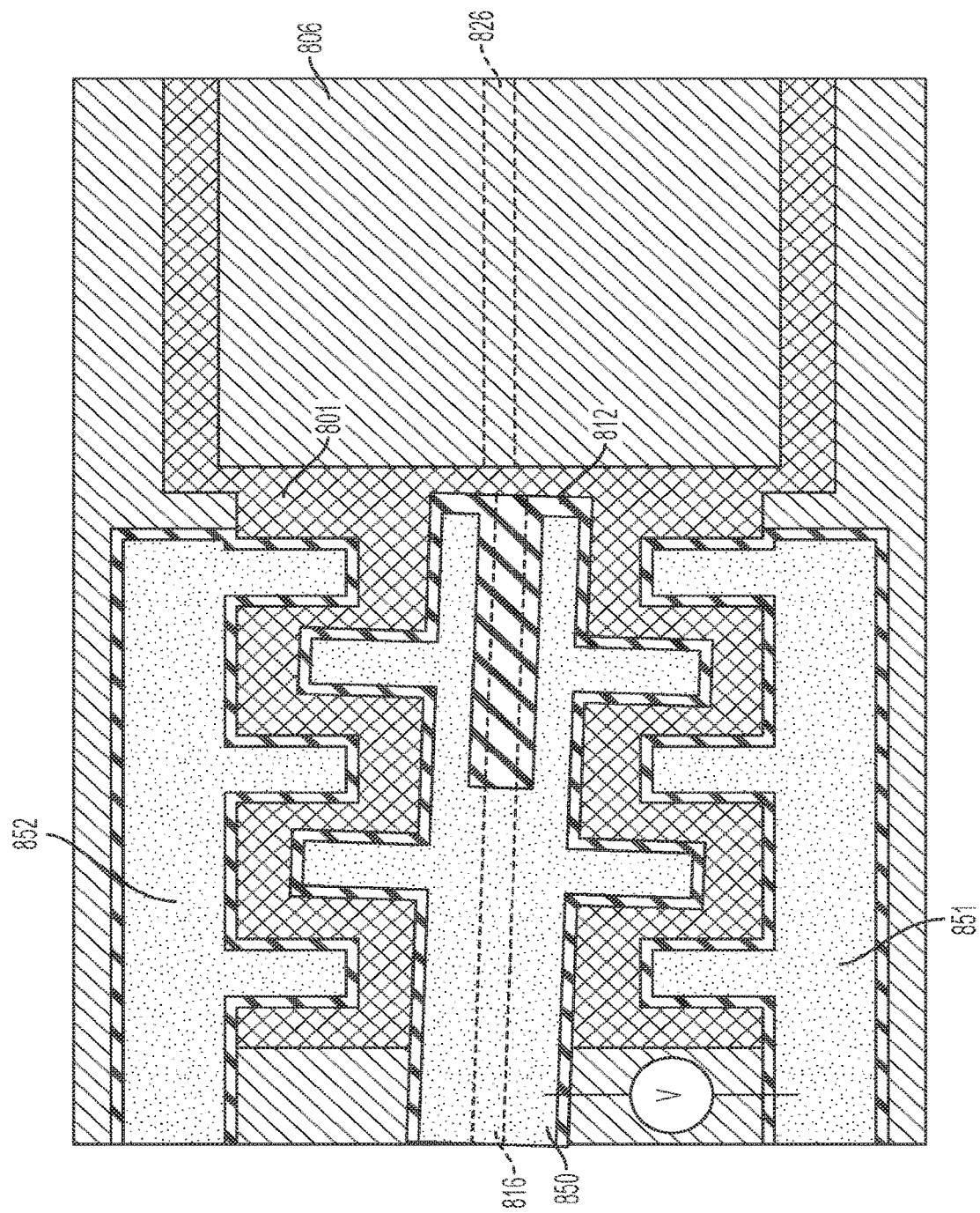

FIGS. 8C-8E illustrate a representative sequence for laterally aligning optical waveguide 816 to optical waveguide 826. The embodiment of FIGS. 8C-8E comprises electrodes patterned to include fingers extending along the y-axis. The fingers may be interdigitated to improve the attractive/repulsive forces between the electrodes. For example, electrode 852 may include fingers extending towards regions of the electrode 850 formed between adjacent fingers, and vice versa. A similar configuration may be used for electrode 851. As illustrated, a portion 860 of electrode 850 may be removed in correspondence with the distal end of optical waveguide 816 to limit absorption losses due to the electrode.

As illustrated in FIG. 8D, when a voltage is applied between electrodes 852 and 850 such that electrode 850 is at a higher potential, cantilever 816 may pivot closer to fixed portion 842. As illustrated in FIG. 8E, when a voltage is applied between electrodes 851 and 850 such that electrode 850 is at a higher potential, cantilever 816 may pivot closer to fixed portion 840. Control circuitry 501 may be used to adjust the direction and extent of the deflection of cantilever 812, until the optical waveguides 816 and 826 are optically aligned (e.g., until it is determined that the coupling loss is below a predefined threshold). Once the optical waveguides are aligned, the cantilever 812 may be secured to the optical device 806.

In some embodiments, cantilever biasing elements of the types described herein may be used to bias a cantilever vertically and laterally, thus enabling two-dimensional alignment. In some such embodiments, the cantilever biasing element may comprise a heater for vertically biasing the cantilever and an electrode for laterally biasing the cantilever in connection with other electrodes formed on fixed portions. It should be appreciated that, in some embodiments, the cantilever may be secured to the optical device once it is determined that the optical waveguides are optically aligned in the vertical direction and in the lateral direction.

In some embodiments, a PIC may comprise more than one cantilever, with an optical waveguide disposed in each of the cantilevers. In this way, the various optical waveguides of the PIC can be aligned to respective optical waveguides of an optical device. The cantilevers may be controlled using separate cantilever biasing elements, or with the same cantilever biasing element. In some embodiments, multiple optical waveguides may be disposed in a single cantilever. In this way, biasing of the cantilever causes all the optical waveguides to be biased. In this configuration, alignment of a pair of optical waveguides may lead to self-alignment of other pairs of optical waveguides.

Figure 9:
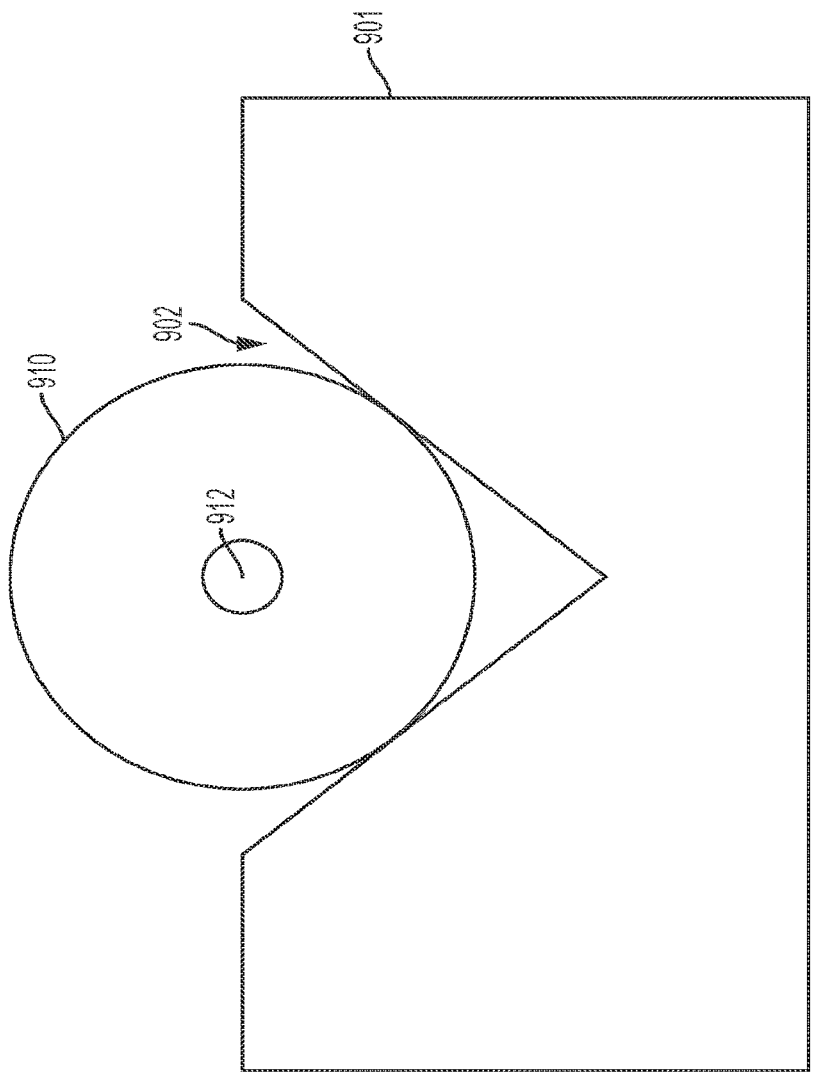
FIG. 9 is a front view illustrating a groove assembly and an optical fiber disposed in the groove assembly, according to some non-limiting embodiments.

Methods and apparatuses of the type described herein may be used for aligning, in one or two dimensions, a PIC to an optical fiber. In some embodiments, optical fibers may be co-packaged with PICs using dedicated assemblies, such as groove assemblies. A representative groove assembly is depicted in FIG. 9. Groove assembly 901 may comprise a groove 902 configured to receive an optical fiber 910 therein. Groove 902 may be a V-groove in some embodiments. V-grooves may be formed, for example, by etching a silicon substrate along its crystallographic axes. The geometry of the V-groove may be designed such that core 912 of optical fiber 910 is at least coarsely, aligned with an optical waveguide of a PIC. To finely align the core to the optical waveguide, techniques of the types described herein may be used.

Figure 10A:
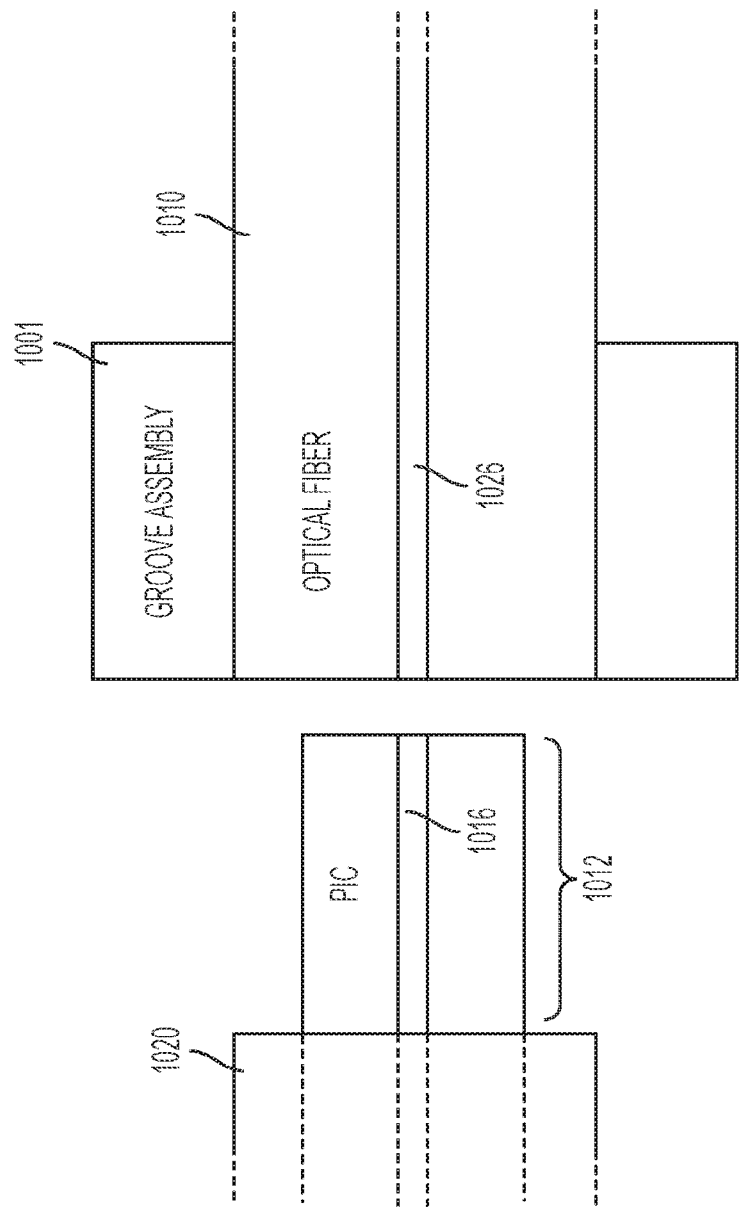
FIG. 10A is a top view illustrating a photonic integrated circuit cantilever and an optical fiber disposed in a groove assembly, according to some non-limiting embodiments.

FIG. 10A illustrates an optical system including a PIC having a cantilever 1012 positioned on a support 1020 and a groove assembly 1001 having an optical fiber 1010 mounted thereon. The optical fiber comprises a core 1026. Cantilever 1012 may be actuated, using the techniques described herein, to laterally and/or vertically align optical waveguide 1016 to core 1026.

Figure 10B:
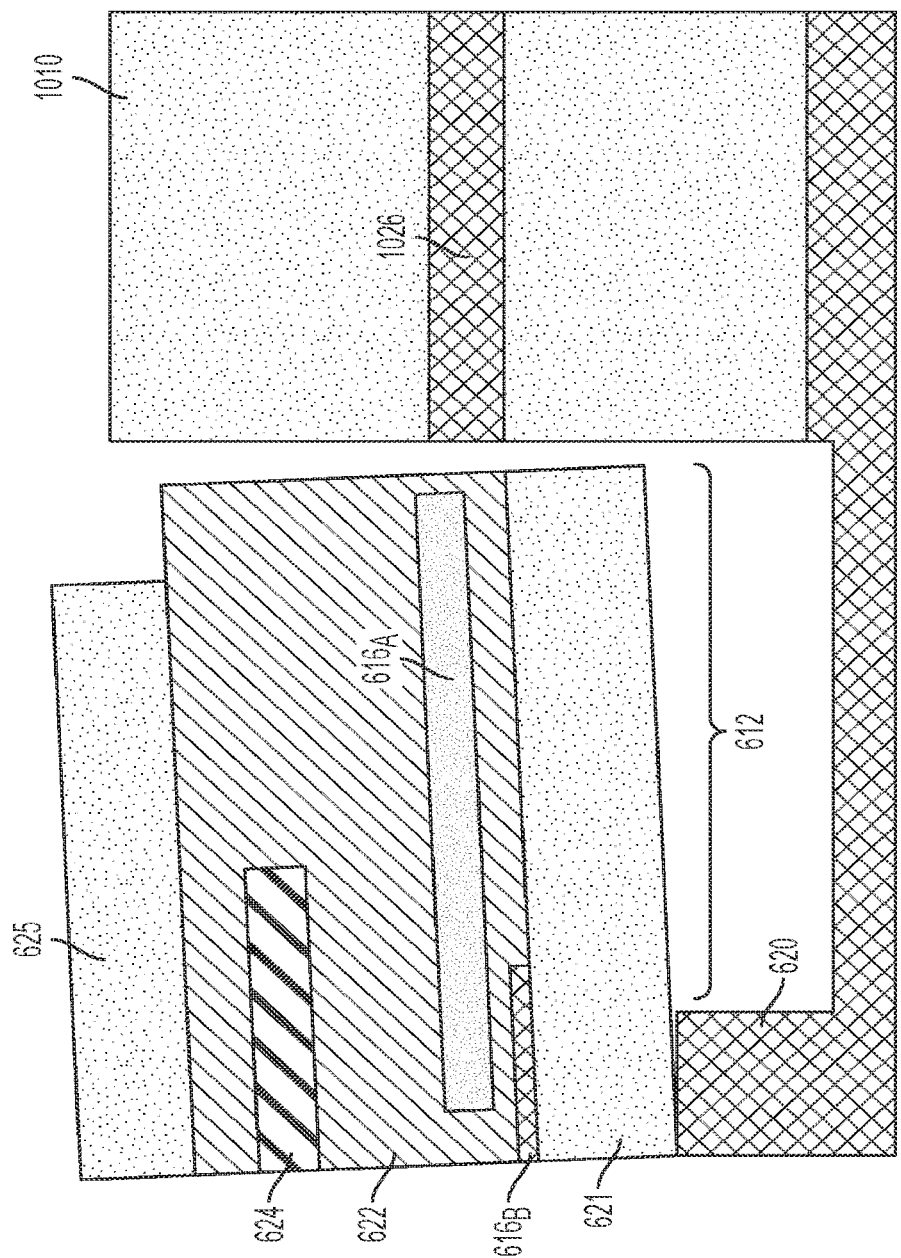
FIGS. 10B-10D are sides views illustrating a representative sequence for optically aligning, along a vertical direction, a photonic integrated circuit to an optical fiber, according to some non-limiting embodiments.
Figure 10C:
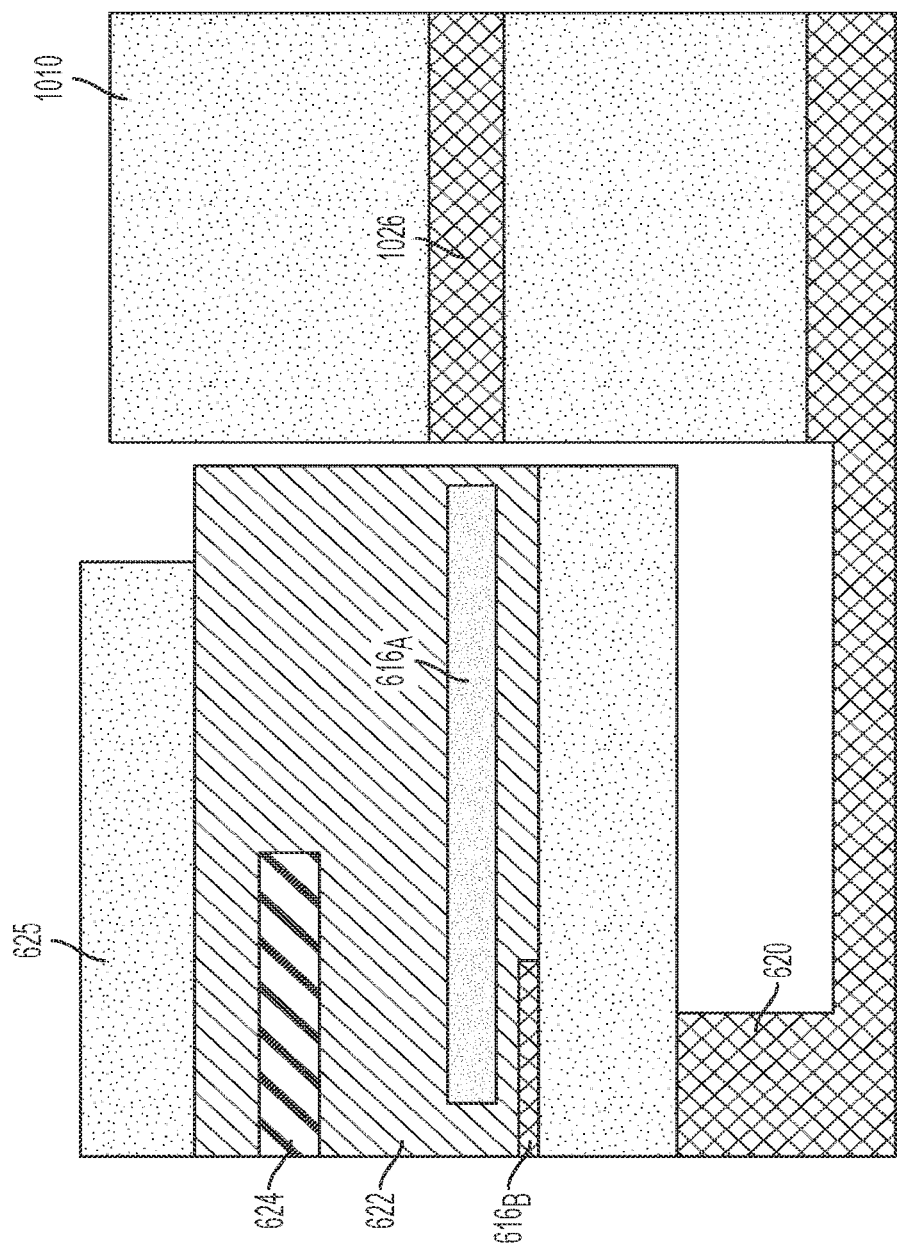
Figure 10D:
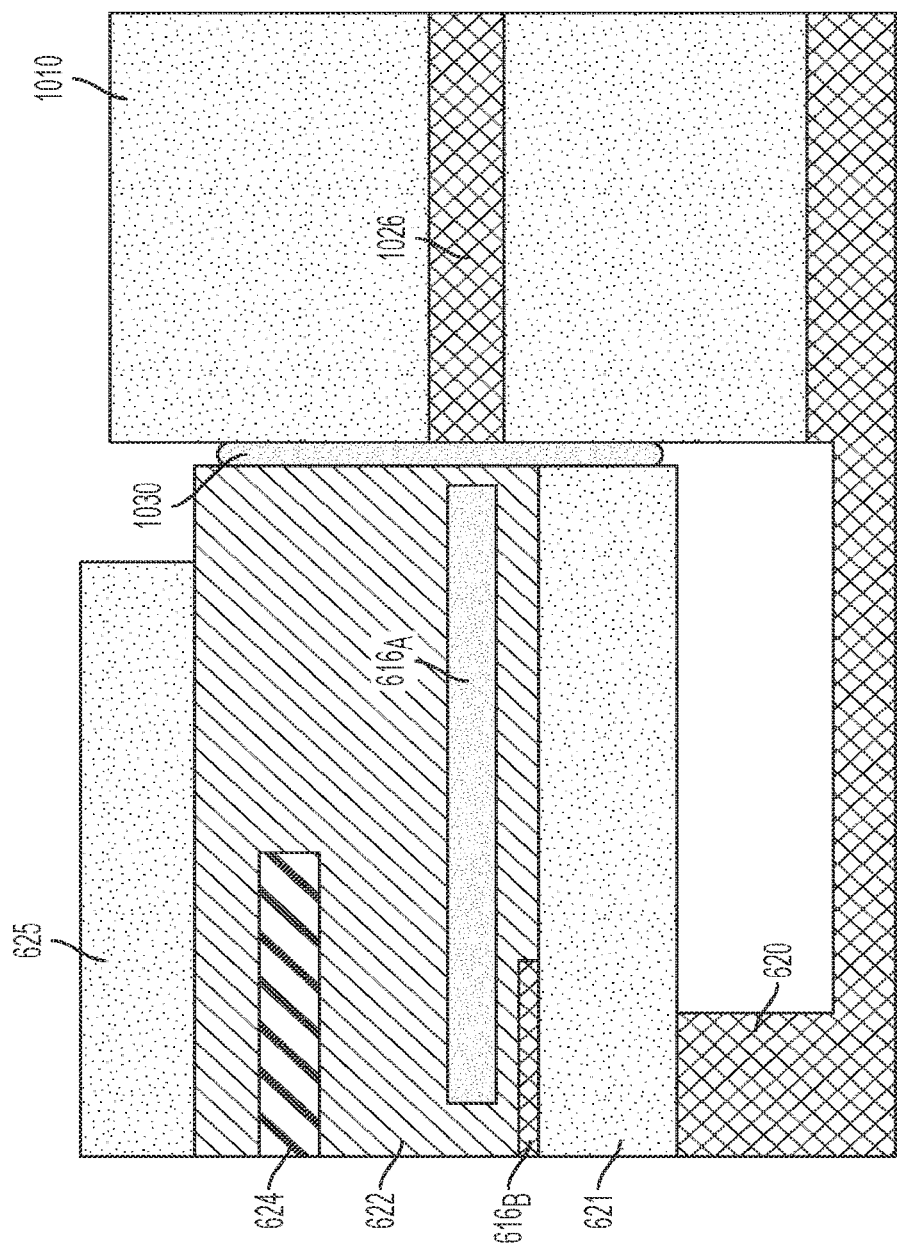

A representative sequence for vertically aligning the optical waveguide to the core of an optical fiber is illustrated in Ms. 10B-10D. The PIC of FIGS. 10B-10D operates in the same manner described in connection with FIGS. 6A-6C. As a result, when no current flows in the conductive layer 624, the cantilever may be bent (for example away from the top surface of the substrate, as shown in FIG. 10B), When an appropriate amount of current is allowed to flow in the conductive layer 624, the cantilever may bend such that the distal end of the optical waveguide $616_A$ is re-oriented. When it is determined that optical waveguide $616_A$ is aligned to core 1026, for example, using control circuitry 501, cantilever 612 may be secured to the optical fiber and/or to the groove assembly on which the optical fiber is disposed. Securing of the cantilever may be performed using an epoxy 1030 or other gluing materials.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide methods for optically align optical waveguides formed in photonic integrated circuit to optical devices, such as laser waveguides, optical fibers or other photonic integrated circuit waveguides. In contrast to conventional systems, the alignment mechanisms are mounted on the PIC itself, and as such, no external active coupling mechanisms such as micropositioners are needed. As a result, the cost of packaging may be reduced significantly.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A method comprising:
spatially biasing a free end of a photonic integrated circuit cantilever by electrically actuating a cantilever biasing element disposed in the photonic integrated circuit cantilever, the photonic integrated circuit cantilever having a proximal end connected to a substrate; and
securing, using a gluing material, the free end of the photonic integrated circuit cantilever to an optical device disposed outside the substrate to prevent the free end of the cantilever from moving by fixing the alignment of the free end of the cantilever to the optical device disposed outside the substrate.

2. The method of claim 1, further comprising coupling an optical signal between a first optical waveguide formed at least partially in the photonic integrated circuit cantilever with a second optical waveguide disposed on the optical device.

3. The method of claim 2, wherein securing the photonic integrated circuit cantilever to the optical device is performed in response to determining that a coupling loss between the first and second optical waveguides is less than a predefined threshold.

4. The method of claim 2 wherein the gluing material is disposed between the first optical waveguide and the second optical waveguide.

5. The method of claim 4 wherein the first optical waveguide is optically coupled to the second optical waveguide.

6. The method of claim 1, wherein electrically activating the cantilever biasing element comprises driving a current through a conductive layer disposed at least partially within the photonic integrated circuit cantilever.

7. The method of claim 1, wherein electrically activating the cantilever biasing element comprises generating a voltage between a first biasing electrode formed in the photonic integrated circuit cantilever and a second biasing electrode disposed in a fixed portion of the substrate.

8. The method of claim 1 wherein the gluing material is an epoxy.

9. The method of claim 1 wherein the free end of the cantilever is separated from the proximal end of the cantilever by a distance that is between 50 μm and 1 mm.

10. The method of claim 1 wherein the cantilever lacks support at least in a region that is within 50 μm from the free end of the cantilever.

11. The method of claim 1 wherein the spatially biasing element is configured to bias the free end of the cantilever in a direction that is out of a plane parallel to a top surface of the substrate.

12. The method of claim 1 wherein the cantilever biasing element is configured to spatially bias the free end of the cantilever in a plane parallel to a top surface of the substrate.

13. The method of claim 1 wherein the free end of the cantilever and the first fixed portion of the cantilever are separated from one another in a direction parallel to a top surface of the substrate.

14. The method of claim 1 wherein the cantilever comprises a first layer having a first coefficient of thermal expansion and a second layer having a second coefficient of thermal expansion, and the cantilever biasing element comprises a conductive layer.

15. The method of claim 14 wherein the conductive layer is disposed in the first layer.

16. The method of claim 1 wherein the optical device has a first optical waveguide that has an end that is within 30 μm from the free end of the cantilever.

17. The method of claim 1 wherein the gluing material secures the free end of the cantilever to a facet of the optical device.

18. The method of claim 1 wherein the optical device is disposed outside the substrate.

* * * * *